United States Patent [19]

Yoshida

[11] Patent Number: 5,638,314
[45] Date of Patent: Jun. 10, 1997

[54] DIVIDING APPARATUS FOR USE IN A DATA PROCESSING APPARATUS

[75] Inventor: Yuji Yoshida, Kawasaki, Japan

[73] Assignee: Fujitsu Limited, Kawasaki, Japan

[21] Appl. No.: 329,317

[22] Filed: Oct. 26, 1994

[30] Foreign Application Priority Data

Feb. 28, 1994 [JP] Japan ................................. 6-029468

[51] Int. Cl.$^6$ ........................................................ G06F 7/52
[52] U.S. Cl. ............................................. 364/767; 364/763
[58] Field of Search ................................... 364/761, 762, 364/763, 764, 766, 767

[56] References Cited

U.S. PATENT DOCUMENTS

| | | | |
|---|---|---|---|
| 3,733,477 | 5/1973 | Tale et al. ................................. | 364/767 |
| 4,546,447 | 10/1985 | Sawada ..................................... | 364/767 |
| 5,446,651 | 8/1995 | Moyse et al. .............................. | 364/760 |

FOREIGN PATENT DOCUMENTS

| | | |
|---|---|---|
| 55-82352 | 6/1980 | Japan . |
| 57-111738 | 7/1982 | Japan . |
| 58-132837 | 8/1983 | Japan . |

Primary Examiner—Chuong D. Ngo
Attorney, Agent, or Firm—Armstrong, Westerman, Hattori, McLeland & Naughton

[57] ABSTRACT

A dividing apparatus which allows settlement of a quotient of one digit with a simple circuit construction is disclosed. A plurality of different integer multiples are simultaneously subtracted individually from a dividend or an intermediate remainder, and when all of results of the subtraction are in the negative in sign, the dividend or intermediate remainder before the subtraction is selected as it is as a new intermediate remainder, but when some or all of the results of the subtraction are in the positive in sign or zero, that one of those results of the subtraction having the positive sign or the value of zero which corresponds to a highest one of the multiples is selected as a new intermediate remainder, whereafter the states of carry signals corresponding to the results of the subtraction are held. A processing cycle of the operations is repetitively executed by a plurality of times, and then a quotient is calculated in accordance with the held states of the carry signals. The dividing apparatus can be applied to division of a dividend by a divisor both in the form of decimal data in binary-coded decimal notation.

15 Claims, 9 Drawing Sheets

FIG. 3

| CYCLE | SUBTRACTION OPERATION | | POSITIVE/NEGATIVE SIGN OF RESULT OF SUBTRACTION | | RESULT SELECTED |
|---|---|---|---|---|---|
| | SUBTRACTION CIRCUIT 107 | SUBTRACTION CIRCUIT 108 | R1 | R2 | |
| 1 | R — 3D | R — 6D | NEGATIVE<br>NEGATIVE<br>POSITIVE<br>POSITIVE | NEGATIVE<br>POSITIVE<br>NEGATIVE<br>POSITIVE | R<br>※IMPOSSIBLE<br>R1 = R — 3D<br>R2 = R — 6D |
| 2 | R — 1D | R — 2D | NEGATIVE<br>NEGATIVE<br>POSITIVE<br>POSITIVE | NEGATIVE<br>POSITIVE<br>NEGATIVE<br>POSITIVE | R<br>※IMPOSSIBLE<br>R1 = R — 1D<br>R2 = R — 2D |
| 3 | R — 1D | R — 2D | NEGATIVE<br>NEGATIVE<br>POSITIVE<br>POSITIVE | NEGATIVE<br>POSITIVE<br>NEGATIVE<br>POSITIVE | R<br>※IMPOSSIBLE<br>R1 = R — 1D<br>R2 = R — 2D |

FIG. 4

| RESULT OF CALCULATION IN FIRST CYCLE | | RESULT OF CALCULATION IN SECOND CYCLE | | RESULT OF CALCULATION IN THIRD CYCLE | | QUOTIENT | NUMBER OF CYCLES NECESSARY FOR DETERMINATION OF QUOTIENT |
|---|---|---|---|---|---|---|---|
| R—3D | R—6D | R—1D | R—2D | R—1D | R—2D | | |
| NEGATIVE | NEGATIVE | NEGATIVE | NEGATIVE | — | — | 0 | 2 |
| | | NEGATIVE | POSITIVE | — | — | ※ | 1 |
| | | POSITIVE | NEGATIVE | — | — | 1 | 2 |
| | | POSITIVE | POSITIVE | — | — | 2 | 2 |
| NEGATIVE | POSITIVE | — | — | — | — | ※ | 1 |
| POSITIVE | NEGATIVE | NEGATIVE | NEGATIVE | — | — | 3 | 2 |
| | | NEGATIVE | POSITIVE | — | — | ※ | 1 |
| | | POSITIVE | NEGATIVE | — | — | 4 | 2 |
| | | POSITIVE | POSITIVE | — | — | 5 | 2 |
| | | NEGATIVE | NEGATIVE | — | — | 6 | 2 |
| | | NEGATIVE | POSITIVE | — | — | ※ | 1 |
| | | POSITIVE | NEGATIVE | — | — | 7 | 2 |
| POSITIVE | POSITIVE | POSITIVE | POSITIVE | NEGATIVE | NEGATIVE | 8 | 3 |
| | | | | NEGATIVE | POSITIVE | ※ | 1 |
| | | | | POSITIVE | NEGATIVE | 9 | 3 |
| | | | | POSITIVE | POSITIVE | ※ | 1 |

MARK ※ IN COLUMN OF QUOTIENT REPRESENTS IMPOSSIBLE COMBINATION

FIG.7

| CYCLE | | SUBTRACTION OPERATION | | POSITIVE/NEGATIVE SIGN OF RESULT OF SUBTRACTION | | RESULT SELECTED |
|---|---|---|---|---|---|---|
| | | SUBTRACTION CIRCUIT 107 | SUBTRACTION CIRCUIT 108 | R1 | R2 | |
| 1 | | R − 3D | R − 6D | NEGATIVE | NEGATIVE | R |
| | | | | NEGATIVE | POSITIVE | *IMPOSSIBLE |
| | | | | POSITIVE | NEGATIVE | R1 = R − 3D |
| | | | | POSITIVE | POSITIVE | R2 = R − 6D |
| 2 | WHEN r ≧ 3d | R − 3D | R − 2D | NEGATIVE | NEGATIVE | *IMPOSSIBLE |
| | | | | NEGATIVE | POSITIVE | R2 = R − 2D |
| | | | | POSITIVE | NEGATIVE | *IMPOSSIBLE |
| | | | | POSITIVE | POSITIVE | R1 = R − 3D |
| | WHEN r < 3d | R − 1D | R − 2D | NEGATIVE | NEGATIVE | R |
| | | | | NEGATIVE | POSITIVE | *IMPOSSIBLE |
| | | | | POSITIVE | NEGATIVE | R1 = R − 1D |
| | | | | POSITIVE | POSITIVE | R2 = R − 2D |

FIG. 8

| RESULT OF CALCULATION IN FIRST CYCLE | | RESULT OF CALCULATION IN SECOND CYCLE | | QUOTIENT | NUMBER OF CYCLES NECESSARY FOR DETERMINATION OF QUOTIENT |
|---|---|---|---|---|---|
| R−3D | R−6D | R−1D | R−2D | | |
| NEGATIVE | NEGATIVE | NEGATIVE | NEGATIVE | 0 | 2 |
| | | NEGATIVE | POSITIVE | ※ | — |
| | | POSITIVE | NEGATIVE | 1 | 2 |
| | | POSITIVE | POSITIVE | 2 | 2 |
| NEGATIVE | POSITIVE | — | — | ※ | — |
| POSITIVE | NEGATIVE | NEGATIVE | NEGATIVE | 3 | 2 |
| | | NEGATIVE | POSITIVE | ※ | — |
| | | POSITIVE | NEGATIVE | 4 | 2 |
| | | POSITIVE | POSITIVE | 5 | 2 |
| POSITIVE | POSITIVE | WHEN r≧3d (P=1) | | WHEN r<3d (P=0) | |
| | | R−3D / R−2D | | R−1D / R−2D | |
| | | NEGATIVE NEGATIVE | | | — | — |
| | | NEGATIVE POSITIVE | | | ※ | — |
| | | POSITIVE NEGATIVE | | | — | — |
| | | POSITIVE POSITIVE | | | — | — |
| | | | | NEGATIVE NEGATIVE | 8 | 2 |
| | | | | NEGATIVE POSITIVE | ※ | — |
| | | | | POSITIVE NEGATIVE | 9 | 2 |
| | | | | POSITIVE POSITIVE | 6 | 2 |
| | | | | NEGATIVE NEGATIVE | ※ | — |
| | | | | NEGATIVE POSITIVE | 7 | 2 |
| | | | | POSITIVE NEGATIVE | | |
| | | | | POSITIVE POSITIVE | 8 | 2 |

MARK ※ IN COLUMN OF QUOTIENT REPRESENTS IMPOSSIBLE COMBINATION

DIVIDING APPARATUS FOR USE IN A DATA PROCESSING APPARATUS

BACKGROUND OF THE INVENTION

1) Field of the Invention

This invention relates to a dividing apparatus for use with a data processing apparatus for dividing a dividend by a divisor both in the form of decimal data represented in binary-coded decimal notation (BCD).

2) Description of the Related Art

Generally, in a data processing apparatus, decimal data are represented in binary-coded decimal notation. In order to divide a dividend by a divisor both in the form of such decimal data, similarly as in calculation with figures written down on paper, the place positions of uppermost digits of the two operands (dividend and divisor) which are not equal to zero are adjusted to each other (leftward place adjustment), and a quotient is calculated successively for different digits beginning with the uppermost place digit to obtain a final quotient. Accordingly, the speed of decimal division can be raised by decreasing the time required for calculation of a quotient of a certain one digit.

Here, the following two methods are listed as the most basic method for calculating a quotient of each digit.

1. A divisor is successively subtracted from a dividend or an intermediate remainder (the terminology "intermediate remainder" is hereinafter used as far as there is no need of particularly distinguishing a divisor and an intermediate remainder from each other) while the number of times of such division is counted until after the result of subtraction becomes a negative value, and a quotient is determined based on the count value.

2. A quotient forecasting circuit or a quotient forecasting table is prepared in advance, and a quotient of one digit is forecast based on several upper bits of an intermediate remainder and a divisor by the quotient forecasting circuit or using the quotient forecasting table, whereafter a multiple or multiples of the divisor prepared in advance or a multiple of the divisor obtained by combining such multiples and corresponding to the forecast quotient is subtracted from the dividend and then the forecast quotient is corrected in accordance with the positive or negative sign of the result of subtraction.

With the first method described above, when the quotient is "0", at least one time of subtraction processing is required; when the quotient is "1", two times of subtraction processing are required; . . . ; when the quotient is "8", nine times of subtraction processing are required; and when the quotient is "9", nine times of subtraction processing (the quotient is never equal to 10) are required. Accordingly, the minimum number of cycles required for calculation processing for a quotient of one digit is 5.4 on the average and 9 in the maximum.

With the first method described above, as the value of the quotient increases, the number of subtraction calculations increases, and accordingly, high speed decimal division can be achieved by reducing the number of quotient calculation cycles to reduce the processing time when the value of the quotient is high.

For example, if a five-fold multiple of the divisor is prepared with the average value of the quotient regarded as "5" and it is checked whether or not the quotient in quotient calculation processing is equal to or higher than "5", that is, whether or not an intermediate remainder is equal to or higher than five times the divisor and then, when the quotient is equal to or higher than "5", the five-fold multiple is subtracted from the intermediate remainder, whereafter repetitive subtraction calculations of the divisor are performed (refer to, for example, Japanese Patent Laid-Open Application No. Showa 58-132837), then when the quotient is "0", a quotient of one digit can be calculated by two times of subtraction processing; when the quotient is "1", a quotient of one digit can be calculated by three times of subtraction processing; when the quotient is "2", a quotient of one digit can be calculated by four times of subtraction processing; when the quotient is "3", a quotient of one digit can be calculated by five times of subtraction processing; when the quotient is "4", a quotient of one digit can be calculated by five times of subtraction processing; when the quotient is "5", a quotient of one digit can be calculated by two times of subtraction processing; when the quotient is "6", a quotient of one digit can be calculated by three times of subtraction processing; when the quotient is "7", a quotient of one digit can be calculated by four times of subtraction processing; when the quotient is "8", a quotient of one digit can be calculated by five times of subtraction processing; and when the quotient is "9", a quotient of one digit can be calculated by five times of subtraction processing. Accordingly, in this instance, the minimum number of cycles required for calculation processing for a quotient of one digit can be reduced to 3.8 on the average and to 5 in the maximum.

In order to further reduce the number of repetitive subtraction operations required for calculation of a quotient of one digit, several times of subtraction of a divisor should be reduced to one time of subtraction. In particular, while a multiple or multiples of the divisor must be used, in this instance, the kinds of required multiples and the algorithm for selecting a multiple to be subtracted matter.

Generally, it is a common algorithm for calculating a quotient of one digit that, taking notice of the fact that, in a data processing apparatus, a decimal number is represented by a binary-coded decimal number of 4 bits and the weight of 4 bits is 8, 4, 2, 1 in order beginning with the most significant bit, an eight-fold multiple, a four-fold multiple, a two-fold multiple and a one-fold multiple of a divisor are prepared in advance, and subtraction from a dividend is performed in order for the multiples beginning with a multiple corresponding to the most significant bit of the individual bits of a quotient of one digit, that is, in the order of the eight-fold multiple, the four-fold multiple, the two-fold multiple and the one-fold multiple, and if the result of the subtraction is in the positive in sign, then the corresponding bit of the quotient is turned on to calculate a quotient of one digit (refer to, for example, Japanese Patent Laid-Open Application No. Showa 55-82352).

Here, since the quotient is equal to or lower than "9", if the result of first time subtraction of the eight-fold multiple is in the positive in sign, then there is no need of subsequently subtracting the four-fold multiple, but it is sufficient if only subtraction of the one-fold multiple is performed. Accordingly, the minimum number of times of subtraction of multiples required for calculation of a quotient of one digit is four when the quotient is within the range from "0" to "7", but is two when the quotient is "8" or "9", and accordingly is 3.6 on the average and 4 in the maximum.

It is to be noted that also another decimal dividing method which adopts the same quotient calculation algorithm as that described above except that subtraction of the eight-fold multiple in the processing described above is realized by subtraction of the four-fold multiple by two times (accordingly, three kinds of multiples including a four-fold multiple, a two-fold multiple and a one-fold multiple are used) has been proposed (refer to, for example, Japanese Patent Laid-Open Application No. Showa 57-111738).

With the dividing method which employs the first method described hereinabove, however, in a circumstance at present, in order to settle a quotient of one digit, four times of subtraction in the maximum and 3.6 times of subtraction on the average are required in the minimum case, and the processing time is comparatively long. Thus, it is demanded to further reduce the processing time to achieve higher speed decimal division.

On the other hand, with the second method described hereinabove, the number of times of subtraction can be reduced to once by using a forecast quotient which is equal to or greater by one than a correct quotient. However, if it is tried to construct the quotient forecasting table, for example, with a memory circuit and to look up a value in the quotient forecasting table using three upper digits (12 bits) of an intermediate remainder and two upper digits (8 bits) of a divisor in order to store a value equal to or greater by one than a correct value as a forecast quotient, where the forecast quotient is constituted from 4 bits, a memory capacity of up to 4 bits×1,024 Kwords is required. Consequently, a considerable circuit area is required for the memory, and as the capacity of the memory increases, an increased sufficient read time is required. After all, much processing time is required.

In the meantime, if it is tried to construct the quotient forecasting circuit using logic gates without using a memory circuit, the logic is complicated, which increases the difficulty in designing, and besides, a great number of logic stages are required.

Thus, since a delay time required to forecast a quotient invites an increase of machine cycles in any case, it is actually practical to divide a machine cycle into at least two cycles of a quotient forecasting cycle and a subtraction cycle.

Accordingly, where a forecast quotient is used as in the second method described above, even if correction of a quotient based on the positive or negative sign of a result of subtraction is executed in an overlapping condition with the quotient forecasting cycle for a next digit, two cycles are required for calculation of a quotient of one digit.

Further, with any of the first and second methods described above, when excessive subtraction occurs with a result of subtraction, a further one cycle is required with a restore method wherein a one-fold multiple of a divisor is added to an intermediate remainder, but with a non-restore method wherein processing of adding a one-fold multiple of a divisor is performed substantially in a next quotient calculation cycle, since addition correction of the divisor is additionally performed depending upon whether or not excessive subtraction has occurred in the last quotient calculation processing, the control is further complicated.

As can be recognized from the foregoing, while it is possible to reduce the time required for calculation of a quotient of one digit to two or three cycles using a forecast quotient, there is a subject to be solved in that the circuit area required to obtain a forecast quotient or the complication in circuit designing is increased.

SUMMARY OF THE INVENTION

It is an object of the present invention to provide a dividing apparatus by which the processing time for settling a quotient of one digit is reduced with a simple circuit construction to achieve high speed decimal division without using a complicated quotient forecasting circuit or a quotient forecasting table formed from a memory circuit.

In order to attain the object described above, according to an aspect of the present invention, there is provided a dividing apparatus for implementing a dividing, which comprises the steps of repetitively executing by a plurality of times a processing cycle wherein a plurality of different integer multiples of a divisor are simultaneously subtracted from a dividend or an intermediate remainder, and when all of results of the subtraction are in the negative in sign, the dividend or intermediate remainder before the subtraction is selected as a new intermediate remainder, but when some or all of the results of the subtraction are in the positive in sign or zero, that one of those results of the subtraction having the positive sign or the value of zero which corresponds to a highest one of the multiples is selected as a new intermediate remainder, whereafter the states of carry signals corresponding to the results of the subtraction are held, and calculating a quotient in accordance with the states of the held carry signals corresponding to the results of the subtraction.

According to another aspect of the present invention, there is provided a dividing apparatus for implementing a dividing, which comprises the steps of preparing in advance at least four different multiples of a divisor including a one-fold multiple and a two-fold multiple as integer multiples of the divisor, executing a first cycle of calculation processing for a quotient of one digit wherein two of the integer multiples higher than the two-fold multiple are simultaneously subtracted from a dividend, and when two results of the subtraction are both in the negative in sign, the dividend is selected as it is as an intermediate remainder, but when one of the two results of the subtraction is in the positive in sign or zero, that one of the results of the subtraction which is in the positive in sign or zero is selected as an intermediate remainder, but otherwise when both of the two results of the subtraction are in the positive in sign or zero, that one of the results of the subtraction which corresponds to a highest one of the multiples is selected as an intermediate remainder, whereafter the states of carry signals corresponding to the two results of the subtraction are held, executing a second cycle or second and following cycles of the calculation processing for a quotient of one digit wherein the one-fold multiple and the two-fold multiple are simultaneously subtracted from the intermediate remainder, and when two results of the subtraction are both in the negative in sign, the intermediate remainder is selected as it is as an intermediate remainder, but when one of the two results of the subtraction is in the positive in sign or zero, that one of the results of the subtraction which is in the positive in sign or zero is selected as an intermediate remainder, but otherwise when both of the two results of the subtraction are in the positive in sign or zero, that one of the results of the subtraction which corresponds to the highest multiple is selected as an intermediate remainder, whereafter the states of the carry signals corresponding to the two results of the subtraction are held, and calculating a quotient of one digit in accordance with the states of the held carry signals corresponding to the two results of the subtraction.

According to a further aspect of the present invention, there is provided a dividing apparatus for implementing a dividing, which comprises the steps of preparing in advance four different multiples of a divisor including a one-fold multiple, a two-fold multiple, a three-fold multiple and a six-fold multiple as integer multiples of the divisor, executing a first cycle of calculation processing for a quotient of one digit wherein the three-fold multiple and the six-fold multiple are simultaneously subtracted from a dividend, and when two results of the subtraction are both in the negative in sign, the dividend is selected as it is as an intermediate remainder, but when one of the two results of the subtraction is in the positive in sign or zero, that one of the results of the subtraction which is in the positive in sign or zero is selected as an intermediate remainder, but otherwise when both of the two results of the subtraction are in the positive in sign or zero, the result of the subtraction of the six-fold multiple is selected as an intermediate remainder, whereafter the states of carry signals corresponding to the two results of the subtraction are held, executing a second cycle of the calculation processing for a quotient of one digit wherein, when the two results of the subtraction in the first cycle are both in the positive in sign or zero, two upper digits of the intermediate remainder are first compared with two upper digits of the three-fold multiple of the divisor, and when the two upper digits of the intermediate remainder are equal to or higher than the two upper digits of the three-fold multiple of the divisor, the two-fold multiple and the three-fold multiple of the divisor are simultaneously subtracted from the intermediate remainder, and when two results of the subtraction are both in the negative in sign, the intermediate remainder is selected as it is as a new intermediate remainder, but when one of the two results of the subtraction is in the positive in sign or zero, that one of the results of the subtraction which is in the positive in sign or zero is selected as a new intermediate remainder, but otherwise when both of the two results of the subtraction are in the positive in sign or zero, the result of the subtraction of the three-fold multiple is selected as a new intermediate remainder, whereafter the states of the carry signals corresponding to the two results of the subtraction are held, but when the two results of the subtraction in the first cycle are both in the positive in sign or zero and the two upper digits of the intermediate remainder are lower than the two upper digits of the three-fold multiple of the divisor or when the two results of the subtraction in the first cycle are both in the negative in sign or one of the two results is in the positive in sign or zero, the one-fold multiple and the two-fold multiple of the divisor are simultaneously subtracted from the intermediate remainder, and when two results of the subtraction are both in the negative in sign, the intermediate remainder is selected as it is as a new intermediate remainder, but when one of the two results of the subtraction is in the positive in sign or zero, that one of the results of the subtraction which is in the positive in sign or zero is selected as a new intermediate remainder, but otherwise when both of the two results of the subtraction are in the positive in sign or zero, the result of the subtraction of the two-fold multiple is selected as a new intermediate remainder, whereafter the states of the carry signals corresponding to the two results of the subtraction are held, and calculating a quotient of one digit in accordance with the states of the held carry signals corresponding to the two results of the subtraction and the result of the comparison between the two upper digits of the intermediate remainder and the two upper digits of the three-fold multiple of the divisor.

According to a still further aspect of the present invention, there is provided a dividing apparatus which comprises a remainder register for holding a dividend or an intermediate remainder, multiple holding means for holding a plurality of different integer multiples of a divisor, a plurality of subtraction circuits for individually subtracting different ones of the integer multiples from the dividend or intermediate remainder of the remainder register, a plurality of multiple selection circuits for individually selecting different ones of the integer multiples held in the multiple holding means and outputting the selected integer multiples to the subtraction circuits, a first control circuit for switchably controlling those of the integer multiples to be selected by the multiple selection circuits, a flag circuit for storing the states of carry signals from the subtraction circuits as flags, an intermediate remainder selection circuit for selecting one of the dividend or intermediate remainder from the remainder register and results of the subtraction by the subtraction circuits as a new intermediate remainder and outputting the new intermediate remainder to the remainder register, a second control circuit for switchably controlling the intermediate remainder to be selected by the intermediate remainder selection circuit in response to the carry signals from the subtraction circuits, and a quotient determination circuit for determining a quotient of one digit in accordance with the states of the carry signals from the subtraction circuits stored in the flag circuit, and wherein, in a first processing cycle, the multiple selection circuits are switchably controlled by the first control circuit such that a plurality of suitable ones of the integer multiples from the multiple holding means are individually selected by the multiple selection circuits and outputted to the subtraction circuits, the suitable integer multiples selected by the multiple selection circuits are simultaneously subtracted from the dividend or intermediate remainder of the remainder register individually by the subtraction circuits, the intermediate remainder selection circuit is switchably controlled in response to the carry signals from the subtraction circuits by the second control circuit such that, when all of the results of the subtraction by the subtraction circuits are in the negative in sign, the intermediate remainder selection circuit selects the dividend or intermediate remainder from the remainder register as a new intermediate remainder and outputs the new intermediate remainder to the remainder register, but when some or all of the results of the subtraction by the subtraction circuits are in the positive in sign or zero, the intermediate remainder selection circuit selects that one of those results of the subtraction having the positive sign or the value of zero which corresponds to a highest one of the multiples as a new intermediate remainder and outputs the new intermediate remainder to the remainder register, and the states of the carry signals from the subtraction circuits are successively stored as flags into the flag circuit.

With the dividing apparatus of the present invention, there is an advantage in that, by selecting, for each processing cycle, a plurality of ones of integer multiples of a divisor and simultaneously subtracting them individually from a dividend or an intermediate remainder, a quotient of one digit can be settled in a comparatively small number of cycles without using a complicated quotient forecasting circuit or a quotient forecasting table constituted from a memory circuit, and the processing time for settling a quotient of one digit is reduced with a simplified logic construction and decimal division can be performed at a very high speed.

Where at least four multiples including a one-fold multiple and a two-fold multiple are prepared in advance as the integer multiples of the divisor and two of the integer multiples of the divisor are successively selected and simultaneously subtracted individually from a dividend or an intermediate remainder in accordance with an order determined by an algorithm, the calculation processing for a quotient of one digit can be completed in three cycles in the maximum and in two cycles in the minimum. Consequently, the processing time for settling a quotient of one digit is reduced with a simplified logic construction and decimal division can be performed at a very high speed.

Further, by comparing, when both of two results of subtraction in a first cycle are in the positive in sign, the two upper digits of an intermediate remainder and the two upper digits of the three-fold multiple of the divisor with each other and switching, in response to the relationship in magnitude between them, the multiples to be subtracted in a second cycle either to the two-fold multiple and the three-fold multiple or to the one-fold multiple and the two-fold multiple, whichever one of the values from "0" to "9" the quotient of one digit has, the calculation processing for the quotient of one digit can be completed in fixed two cycles. Consequently, the processing time for settling a quotient of one digit can be further reduced with a simplified logic construction and decimal division can be performed at a very high speed.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 3 is a table illustrating the relationship between subtraction operations executed in different processing cycles in the dividing apparatus of FIG. 2 and a result of subtraction (intermediate remainder) to be selected in response to the positive or negative signs of results of such subtraction;

FIG. 4 is a table illustrating the relationship between the positive or negative signs of results of subtraction in different processing cycles and a quotient in the dividing apparatus of FIG. 2;

FIG. 7 is a table illustrating the relationship between subtraction operations executed in different processing cycles in the dividing apparatus of FIG. 6 and a result of subtraction (intermediate remainder) to be selected in response to the positive or negative signs of results of such subtraction;

FIG. 8 is a table illustrating the relationship between the positive or negative signs of results of subtraction in different processing cycles and a quotient in the dividing apparatus of FIG. 6.

DESCRIPTION OF THE PREFERRED EMBODIMENTS a. Aspect of the Invention

Figure 1:
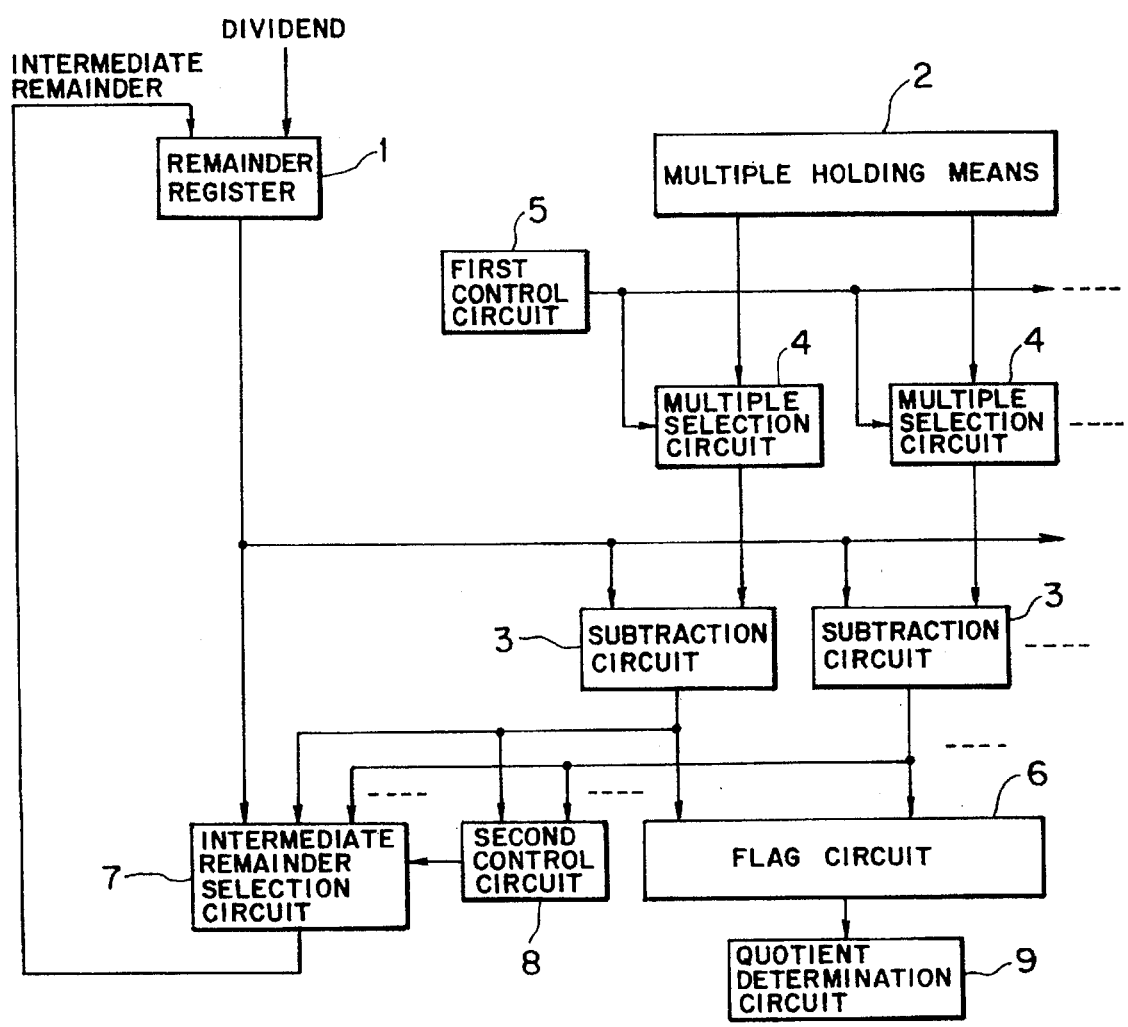
FIG. 1 is a block diagram illustrating one aspect of the present invention.

Referring first to FIG. 1, there is shown a dividing apparatus according to an aspect of the present invention. The dividing apparatus includes a remainder register 1 for holding a dividend or an intermediate remainder, multiple holding means 2 for holding a plurality of different integer multiples of a divisor, a plurality of subtraction circuits 3 for individually subtracting different ones of the integer multiples held in the multiple holding means 2 from the dividend or intermediate remainder of the remainder register 1, a plurality of multiple selection circuits 4 for individually selecting different ones of the integer multiples held in the multiple holding means 2 and outputting the selected integer multiples to the subtraction circuits 3, and a first control circuit 5 for switchably controlling those of the integer multiples to be selected by the multiple selection circuits 4.

The dividing apparatus further includes a flag circuit 6 for storing the states of carry signals from the subtraction circuits 3 as flags, an intermediate remainder selection circuit 7 for selecting one of the dividend (intermediate remainder) from the remainder register 1 and results of the subtraction by the subtraction circuits 3 as a new intermediate remainder and outputting the new intermediate remainder to the remainder register 1, a second control circuit 8 for switchably controlling the intermediate remainder to be selected by the intermediate remainder selection circuit 7 in response to the carry signals from the subtraction circuits 3, and a quotient determination circuit 9 for determining a quotient of one digit in accordance with the states of the carry signals from the subtraction circuits 3 stored in the flag circuit 6.

In the dividing apparatus, in a first processing cycle, the multiple selection circuits 4 are switchably controlled by the first control circuit 5 such that a plurality of suitable ones of the integer multiples from the multiple holding means 2 are individually selected by the multiple selection circuits 4 and outputted to the subtraction circuits 3, and the suitable integer multiples selected by the multiple selection circuits 4 are simultaneously subtracted from the dividend or intermediate remainder of the remainder register 1 individually by the subtraction circuits 3.

Then, the intermediate remainder selection circuit 7 is switchably controlled in response to the carry signals from the subtraction circuits 3 by the second control circuit 8 such that, when all of the results of the subtraction by the subtraction circuits 3 are in the negative in sign, the intermediate remainder selection circuit 7 selects the dividend or intermediate remainder from the remainder register I as a new intermediate remainder and outputs the new intermediate remainder to the remainder register 1, but when some or all of the results of the subtraction by the subtraction circuits 3 are in the positive in sign or zero, the intermediate remainder selection circuit 7 selects that one of those results of the subtraction having the positive sign or the value of zero which corresponds to a highest one of the multiples as a new intermediate remainder and outputs the new intermediate remainder to the remainder register 1. Further, the states of the carry signals from the subtraction circuits 3 are successively stored as flags into the flag circuit 6.

Such processing cycle as described above is repetitively executed by a required number of times.

In the dividing apparatus and the dividing method of the present invention described above, for each processing cycle, a plurality of different ones of the integer multiples of the divisor from the multiple holding means 2 are selected by the multiple selection circuits 4 and simultaneously subtracted individually from the dividend or intermediate remainder by the subtraction circuits 3. Then, in response to the positive or negative signs of results of the subtraction of the subtraction circuits 3 (states of the carry signals), the intermediate remainder selection circuit 7 selects, when the results of the subtraction are in the positive in sign, the result of the subtraction of a highest one of the integer multiples and stores it into the remainder register 1, but when all of the results of the subtraction are in the negative in sign, the intermediate remainder selection circuit 7 selects the dividend or intermediate remainder before the subtraction and stores it into the remainder register 1. Thereafter, the states of the carry signals indicative of the positive or negative signs of the subtraction circuits 3 are stored into the flag circuit 6. The sequence of operations described above is repeated by a required number of times. Consequently, a quotient of one digit can be settled by a small number of cycles (that is, in a short time) without using a complicated quotient forecasting circuit or a quotient forecasting table formed from a memory circuit.

The dividing apparatus is advantageous in that, by selecting a plurality of different ones of the integer multiples and simultaneously subtracting them individually from a dividend or an intermediate remainder for each processing cycle in this manner, a quotient of one digit can be settled by a small number of cycles without using a complicated quotient forecasting circuit or a quotient forecasting table formed from a memory circuit, and the processing time required for settling a quotient of one digit is reduced with a simplified construction and decimal division can be performed at a very high speed.

Here, the multiple holding means 2 may hold at least four different multiples including a one-fold multiple and a two-fold multiple as the integer multiples of the divisor, and the subtraction circuits 3 and the multiple selection circuits 4 may each be provided by a pair.

In this instance, in a first cycle of calculation processing for a quotient of one digit, the two multiple selection circuits 4 are switchably controlled by the first control circuit 5 such that those two of the integer multiples from the multiple holding means 2 which are higher than the two-fold multiple are individually selected by the two multiple selection circuits 4 and outputted to the two subtraction circuits 3, and the two integer multiples selected by the two multiple selection circuits 4 are simultaneously subtracted individually from the dividend of the remainder register 1 by the two subtraction circuits 3.

Then, the intermediate remainder selection circuit 7 is switchably controlled in response to the carry signals from the two subtraction circuits 3 by the second control circuit 8 such that, when both of the results of the subtraction by the two subtraction circuits 3 are in the negative in sign, the intermediate remainder selection circuit 7 selects the dividend from the remainder register 1 as an intermediate remainder and outputs the intermediate remainder to the remainder register 1, but when one of the results of the subtraction by the two subtraction circuits 3 is in the positive in sign or zero, the intermediate remainder selection circuit 7 selects that one of the two results of the subtraction which has the positive sign or the value of zero as an intermediate remainder and outputs the intermediate remainder to the remainder register 1, but otherwise when both of the results of the subtraction by the two subtraction circuits 3 are in the positive in sign or zero, the intermediate remainder selection circuit 7 selects that one of the results of the subtraction which corresponds to a highest one of the multiples as an intermediate remainder and outputs the intermediate remainder to the remainder register 1. Then, the states of the carry signals from the two subtraction circuits 3 are stored as flags into the flag circuit 6.

Thereafter, in a second cycle or second and following cycles of the calculation processing for a quotient of one digit, the two multiple selection circuits 4 are switchably controlled by the first control circuit 5 such that the one-fold multiple and the two-fold multiple from the multiple holding means 2 are individually selected by the two multiple selection circuits 4 and outputted to the two subtraction circuits 3, and the one-fold multiple and the two-fold multiple selected by the two multiple selection circuits 4 are simultaneously subtracted individually from the intermediate remainder of the remainder register 1 by the two subtraction circuits 3.

Then, the intermediate remainder selection circuit 7 is switchably controlled in response to the carry signals from the two subtraction circuits 3 by the second control circuit 8 such that, when both of the results of the subtraction by the two subtraction circuits 3 are in the negative in sign, the intermediate remainder selection circuit 7 selects the intermediate remainder from the remainder register 1 as a new intermediate remainder and outputs the new intermediate remainder to the remainder register 1, but when one of the results of the subtraction by the two subtraction circuits 3 is in the positive in sign or zero, the intermediate remainder selection circuit 7 selects that one of the two results of the subtraction which has the positive sign or the value of zero as a new intermediate remainder and outputs the new intermediate remainder to the remainder register 1, but otherwise when both of the results of the subtraction by the two subtraction circuits 3 are in the positive in sign or zero, the intermediate remainder selection circuit 7 selects the result of the subtraction of the two-fold multiple as a new intermediate remainder and outputs the new intermediate remainder to the remainder register 1. Thereafter, the states of the carry signals from the two subtraction circuits 3 are stored as flags into the flag circuit 6.

In this manner, by preparing at least four multiples including a one-fold multiple and a two-fold multiple as the integer multiples of the divisor in advance and successively selecting two of the integer multiples of the divisor in accordance with a predetermined procedure (in an order determined by an algorithm) and then subtracting them simultaneously and individually from a dividend or an intermediate remainder, calculation processing for a quotient of one digit can be completed in three cycles in the maximum and in two cycles in the minimum. Accordingly, the processing time required to settle a quotient of one digit is reduced with a simplified logic construction and decimal division can be performed at a very high speed.

Here, a one-fold multiple, a two-fold multiple, a three-fold multiple and a six-fold multiple are suitably employed as the integer multiples of the divisor to be held by the multiple holding means 2.

Where the one-fold multiple, the two-fold multiple, the three-fold multiple and the six-fold multiple are used as the integer multiples of the divisor in this manner, by simultaneously and individually subtracting the three-fold multiple and the six-fold multiple from the dividend in the first cycle, it can be identified to which one of ① the range equal to or lower than "2", ② the range from "3" to "5" and ③ the range equal to or higher than "6" the quotient belongs. Thereafter, by subtracting the one-fold multiple and the two-fold multiple from an intermediate remainder in the second cycle or second and following cycles, the quotient can be identified in the thus identified range. Accordingly, when the quotient of one digit is equal to or less than "7", it can be calculated in 2 cycles, but when the quotient of one digit is "8" or "9", it can be calculated in three cycles. Thus, calculation processing for a quotient of one digit can be completed in three cycles in the maximum and in 2.2 cycles on the average. Consequently, the processing time to settle a quotient of one digit is reduced with a simplified logic construction and decimal division can be performed at a very high speed.

Further, the dividing apparatus may be modified such that the multiple holding means 2 holds four multiples including a one-fold multiple, a two-fold multiple, a three-fold multiple and a six-fold multiple as the integer multiples of the divisor and the subtraction circuits 3 and the multiple selection circuits 4 are each provided by a pair, and that it further comprises a comparison circuit for comparing, upon starting a second cycle of calculation processing for a quotient of one digit, two upper digits of the intermediate remainder held in the remainder register 1 with two upper digits of the three-fold multiple of the divisor held in the multiple holding means 2 to determine the relationship in magnitude between them and notifies a result of the comparison to the first control circuit 5.

In this instance, in a first cycle of the calculation processing for a quotient of one digit, the two multiple selection circuits 4 are switchably controlled by the first control circuit 5 such that the three-fold multiple and the six-fold multiple from the multiple holding means 2 are individually selected by the two multiple selection circuits 4 and outputted to the two subtraction circuits 3, and the three-fold multiple and the six-fold multiple selected by the two multiple selection circuits 4 are simultaneously subtracted individually from the dividend of the remainder register I by the two subtraction circuits 3.

Then, the intermediate remainder selection circuit 7 is switchably controlled in response to the carry signals from the two subtraction circuits 3 by the second control circuit 8 such that, when both of the results of the subtraction by the two subtraction circuits 3 are in the negative in sign, the intermediate remainder selection circuit 7 selects the dividend from the remainder register I as an intermediate remainder and outputs the intermediate remainder to the remainder register 1, but when one of the results of the subtraction by the two subtraction circuits 3 is in the positive in sign or zero, the intermediate remainder selection circuit 7 selects that one of the two results of the subtraction which has the positive sign or the value of zero as an intermediate remainder and outputs the intermediate remainder to the remainder register 1, but otherwise when both of the results of the subtraction by the two subtraction circuits 3 are in the positive in sign or zero, the intermediate remainder selection circuit 7 selects the result of the subtraction of the six-fold multiple as an intermediate remainder and outputs the intermediate remainder to the remainder register 1. Further, the states of the carry signals from the two subtraction circuits 3 are stored as flags into the flag circuit 6.

Then, in a second cycle of the calculation processing for a quotient of one digit, the two upper digits of the intermediate remainder held by the remainder register 1 are first compared with the two upper digits of the three-fold multiple of the divisor held in the multiple holding means 2 by the comparison circuit. Then, when the comparison by the comparison circuit proves that the two upper digits of the intermediate remainder are equal to or higher than the two upper digits of the three-fold multiple of the divisor, the two multiple selection circuits 4 are switchably controlled by the first control circuit 5 such that the two-fold multiple and the three-fold multiple from the multiple holding means 2 are individually selected by the two multiple selection circuits 4 and outputted to the two subtraction circuits 3. Consequently, the two-fold multiple and the threefold multiple selected by the two multiple selection circuits 4 are simultaneously subtracted individually from the intermediate remainder of the remainder register 1 by the two subtraction circuits 3.

Then, the intermediate remainder selection circuit 7 is switchably controlled in response to the carry signals from the two subtraction circuits 3 by the second control circuit 8 such that, when one of the results of the subtraction by the two subtraction circuits 3 is in the positive in sign or zero, the intermediate remainder selection circuit 7 selects that one of the two results of the subtraction which has the positive sign or the value of zero as a new intermediate remainder and outputs the new intermediate remainder to the remainder register 1, but when both of the results of the subtraction by the two subtraction circuits 3 are in the positive in sign or zero, the intermediate remainder selection circuit 7 selects the result of the subtraction of the three-fold multiple as a new intermediate remainder and outputs the new intermediate remainder to the remainder register 1. Then, the states of the carry signals from the two subtraction circuits 3 and the result of the comparison by the comparison circuit are stored as flags into the flag circuit 6.

On the other hand, when the result of the comparison by the comparison circuit proves that the two upper digits of the intermediate remainder are lower than the two upper digits of the three-fold multiple of the divisor, the two multiple selection circuits 4 are switchably controlled by the first control circuit 5 such that the one-fold multiple and the two-fold multiple from the multiple holding means 2 are individually selected by the two multiple selection circuits 4 and outputted to the two subtraction circuits 3. Consequently, the one-fold multiple and the two-fold multiple selected by the two multiple selection circuits 4 are simultaneously subtracted from the intermediate remainder of the remainder register 1 individually by the two subtraction circuits 3.

Then, the intermediate remainder selection circuit 7 is switchably controlled in response to the carry signals from the two subtraction circuits 3 by the second control circuit 8 such that, when both of the results of the subtraction by the two subtraction circuits 3 are in the negative in sign, the intermediate remainder selection circuit 7 selects the intermediate remainder from the remainder register 1 as a new intermediate remainder and outputs the intermediate remainder to the remainder register 1, but when one of the results of the subtraction by the two subtraction circuits 3 is in the positive in sign or zero, the intermediate remainder selection circuit 7 selects that one of the two results of the subtraction which has the positive sign or the value of zero as a new intermediate remainder and outputs the new intermediate remainder to the remainder register 1, but otherwise when both of the results of the subtraction by the two subtraction circuits 3 are in the positive in sign or zero, the intermediate remainder selection circuit 7 selects the result of the subtraction of the two-fold multiple as a new intermediate remainder and outputs the new intermediate remainder to the remainder register 1. Thereafter, the states of the carry signals from the two subtraction circuits 3 and the result of the comparison by the comparison circuit are stored as flags into the flag circuit 6.

Here, when the quotient is within ③ the range equal to or higher than "6", there are four candidates of "6" to "9" for the quotient, and accordingly, if subtraction is performed using the one-fold multiple and the two-fold multiple in the second cycle, then in order to settle the quotient to "8" or "9", processing of at least two cycles (totaling 3 cycles) is required as described hereinabove.

Therefore, the two upper digits of the intermediate remainder of the remainder register 1 and the two upper digits of the three-fold multiple of the divisor of the multiple holding means 2 are compared with each other by the comparison circuit, and in response to the relationship in magnitude between them, the multiples to be subtracted in the second cycle are switched either to the two-fold multiple and the three-fold multiple or to the one-fold multiple and the two-fold multiple by the first control circuit 5.

In particular, when the two upper digits of the intermediate remainder are equal to or higher than the two upper digits of the three-fold multiple of the divisor, it can be identified that the quotient is equal to or higher than "8", that is, "8" or "9". Thus, by subtracting the two-fold multiple and the three-fold multiple individually from the intermediate remainder, the quotient can be settled to "8" or "9".

In contrast, when the two upper digits of the intermediate remainder are lower than the two upper digits of the three-fold multiple of the divisor, it can be identified that the candidate for the quotient is within the range of ① or ② or within the range of "6" to "8" in the range of ③, and since the number of candidates for the quotient is three in any of the ranges, the quotient can be settled by individually subtracting the one-fold multiple and the two-fold multiple from the intermediate remainder.

Accordingly, by comparing the two upper digits of the intermediate remainder and the two upper digits of the three-fold multiple of the divisor with each other and switchably selecting the multiples to be subtracted in response to the relationship in magnitude between them individually by the multiple selection circuits 4, the calculation processing for a quotient of one digit can be completed within fixed two cycles. Consequently, the processing time required for settling a quotient of one digit can be further reduced with a simplified logic construction and decimal division can be performed at a very high speed.

The multiple holding means 2 may include a one-fold multiple register for holding the one-fold multiple of the divisor, a three-fold multiple register for holding the three-fold multiple of the divisor, a first doubling circuit for multiplying the one-fold multiple from the one-fold multiple register by two to obtain the two-fold multiple of the divisor and outputting the two-fold multiple of the divisor, and a second doubling circuit for multiplying the three-fold multiple from the three-fold multiple register by two to obtain the six-fold multiple of the divisor and outputting the six-fold multiple of the divisor.

Where the multiple holding means 2 is constituted from a one-fold multiple register, a three-fold multiple register and two doubling circuits in this manner, the one-fold multiple and the three-fold multiple can be obtained from the respective registers whereas the two-fold multiple and the six-fold multiple can be calculated by multiplying the one-fold multiple and the three-fold multiple held in the registers by two by means of the respective doubling circuits. Thus, the multiple holding means for holding the four kinds of multiples can be constructed readily.

The dividing apparatus may be modified such that one of the two subtraction circuits 3 is constructed as an addition and subtraction circuit having an addition function and the dividing apparatus further comprises a selection circuit for selecting one of the dividend from the remainder register 1 and the one-fold multiple of the divisor from the one-fold multiple register and outputting the selected value to the addition and subtraction circuit, and that the addition and subtraction circuit adds the one-fold multiple of the divisor from the first one-fold register selected by and inputted from the selection circuit and the two-fold multiple of the divisor from the first doubling circuit selected by and inputted from one of the two multiple selection circuits 4 to calculate the three-fold multiple of the divisor and stores the thus calculated three-fold multiple into the three-fold multiple register.

Where the construction described above is employed, by adding the one-fold multiple of the divisor from the one-fold multiple register selected by the selection circuit and the two-fold multiple of the divisor from the first doubling circuit selected by one of the two multiple selection circuits 4 by means of the addition and subtraction circuit, the three-fold multiple of the divisor to be held by the three-fold multiple register can be obtained readily using the circuit which serves also as a subtraction circuit.

The dividing apparatus may further comprise an error notification circuit for notifying an error when the states of the positive or negative signs of the results of the subtraction by the two subtraction circuits 3 provide a logically impossible combination.

In particular, when only one of the results of the subtraction by the two subtraction circuits 3 is in the positive in sign or zero, naturally the result of subtraction of a smaller one of the two integer multiples is in the positive in sign or zero while the result of subtraction of the other greater one of the two integer multiples is in the negative. However, if the states of the positive or negative signs of the results of the subtraction by the two subtraction circuits 3 should provide a logically impossible combination such as the combination of a positive value or zero as the result of the subtraction of the greater integer multiple and a negative value as the result of the subtraction of the smaller integer multiple, it is determined that some trouble has occurred in the division processing, and an error is notified from the error notification circuit. Consequently, regular division processing can be assured, and the reliability in division processing is enhanced.

b. First Embodiment

Figure 2:
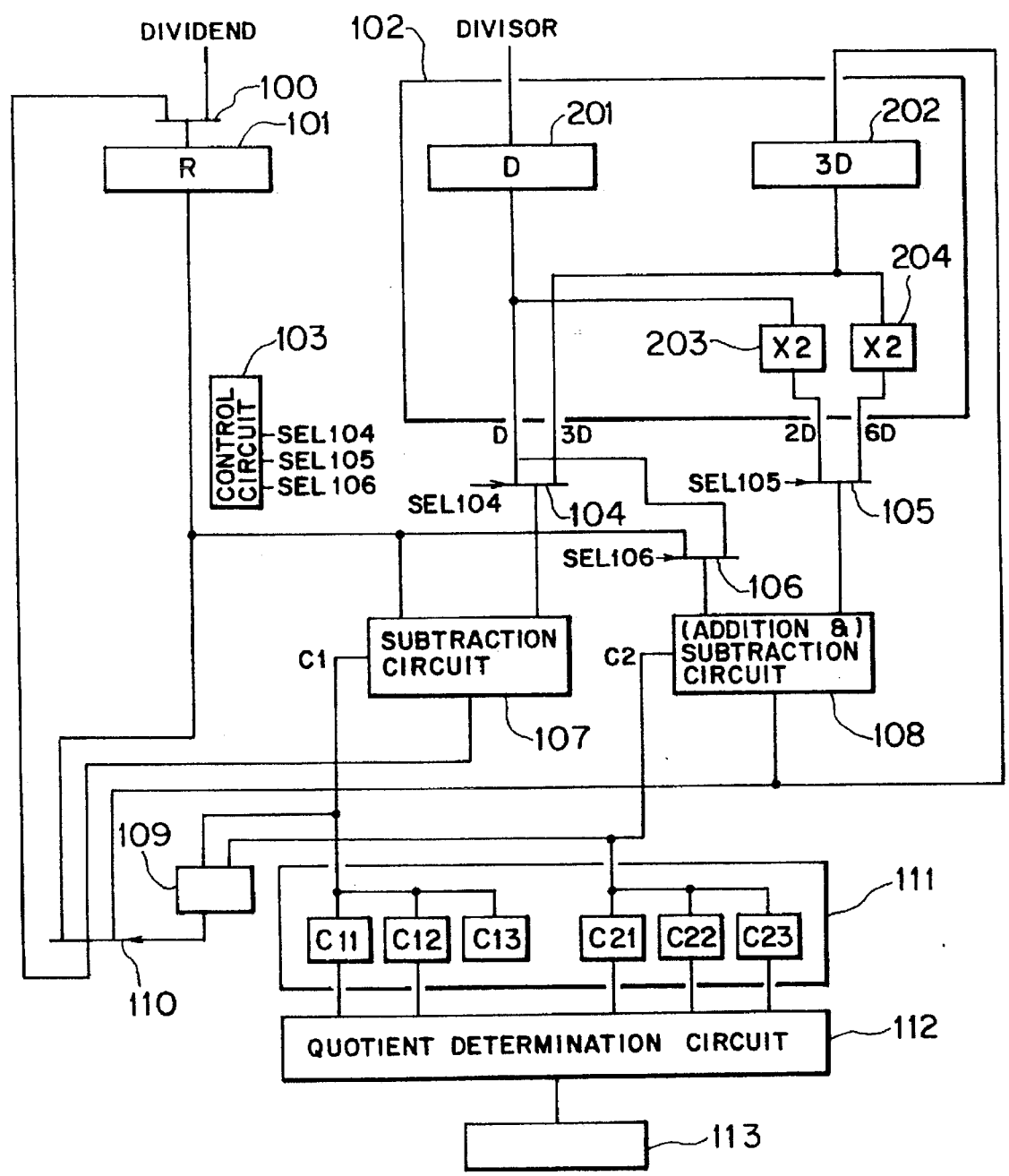
FIG. 2 is a block diagram of a dividing apparatus showing a first preferred embodiment of the present invention.

Referring now to FIG. 2, there is shown a dividing apparatus according to a first preferred embodiment of the present invention. The dividing apparatus shown includes a remainder register 101 for holding a dividend or intermediate remainder R. Before division processing is started, a dividend R is stored into the remainder register 101 by way of a selection circuit 100, and then, after such division processing is started, an intermediate remainder R obtained for each processing cycle is stored into the remainder register 101 by way of the selection circuit 100.

The dividing apparatus further includes a multiple holding circuit 102 serving as multiple holding means for holding a plurality of different integer multiples of a divisor D. In the present embodiment, the multiple holding circuit 102 holds four multiplies of the divisor D including a one-fold multiple D, a two-fold multiple 2D, a three-fold multiple 3D and a six-fold multiple 6D.

The multiple holding circuit 102 is constituted, for example, from a one-fold multiple register 201 for holding the one-fold multiple D of a divisor, a threefold multiple register 202 for holding the three-fold multiple 3D of the divisor, a first doubling circuit 203 for multiplying the one-fold multiple D from the one-fold multiple register 201 by 2 to obtain the two-fold multiple 2D of the divisor and outputting the two-fold multiple 2D of the divisor, and a second doubling circuit 204 for multiplying the three-fold multiple 3D from the three-fold multiple register 202 by 2 to obtain the six-fold multiple 6D of the divisor and outputting the six-fold multiple 6D of the divisor.

The dividing apparatus further includes a first control circuit 103 for controlling the selection operations of a pair of multiple selection circuits 104 and 105 and a selection circuit 106 which will be hereinafter described. Each of the multiple selection circuits 104 and 105 selects one of the four multiples held in the multiple holding circuit 102 and outputs the selected multiple to a subtraction circuit 107 or 108, which will be hereinafter described.

The multiple selection circuit 104 is controlled by the first control circuit 103 and selects and outputs one of the one-fold multiple D (output of the one-fold multiple register 201) and the three-fold multiple 3D (output of the three-fold multiple register 202) from the multiple holding circuit 102 to the subtraction circuit 107. Meanwhile, the multiple selection circuit 105 is controlled by the first control circuit 103 and selects and outputs one of the two-fold multiple 2D (output of the first doubling circuit 203) and the six-fold multiple 6D (output of the second doubling circuit 204) from the multiple holding circuit 102 to the subtraction circuit 108.

The selection circuit 106 is controlled by the first control circuit 103 and selects and outputs one of the dividend R from the remainder register 101 and the one-fold multiple D (output of the one-fold multiple register 201) from the multiple holding circuit 102 to the subtraction circuit 108.

The selection circuit 105 is controlled by the first control circuit 103 such that it normally selects the dividend R from the remainder register 101, but only when the three-fold multiple 3D is to be produced, it selects and outputs the one-fold multiple D from the multiple holding circuit 102.

The subtraction circuit 107 receives, as an input thereto, data (dividend or intermediate remainder R) of the remainder register 101 and receives, as another input thereto, the one-fold multiple D or the three-fold multiple 3D from the multiple holding circuit 102 by way of the multiple selection circuit 104, and subtracts the one-fold multiple D or three-fold multiple 3D from the divisor or intermediate remainder R of the remainder register 101.

Meanwhile, the subtraction circuit 108 normally receives, as an input thereto, data (dividend or intermediate remainder R) of the remainder register 101 by way of the selection circuit 106 and receives, as another input thereto, the two-fold multiple 2D or the six-fold multiple 6D from the multiple holding circuit 102 by way of the multiple selection circuit 105, and subtracts the two-fold multiple 2D or the six-fold multiple 6D from the dividend or intermediate remainder of the remainder register 101.

The subtraction circuit 108 in the present embodiment, however, is constructed as an addition and subtraction circuit having an addition function and executes its addition function only when the three-fold multiple 3D of a divisor is produced.

In the first present embodiment, the three-fold multiple 3D of a divisor held in the three-fold multiple register 202 of the multiple holding circuit 102 is produced in the following manner. In particular, the one-fold multiple of a divisor is the divisor itself, and the two-fold multiple 2D can be obtained immediately from the first doubling circuit 203. Accordingly, the three-fold multiple 3D of the divisor can be obtained by adding the one-fold multiple D and the two-fold multiple 2D. Thus, upon production of the three-fold multiple 3D of the divisor, the one-fold multiple D is selected by the selection circuit 106 while the two-fold multiple 2D is selected by the multiple selection circuit 105, and addition of D+2D is performed by the addition and subtraction circuit 108 and a result of the addition is stored into the three-fold multiple register 202.

It is to be noted that the multiple holding circuit 102 does not necessarily have the construction described above and may be constructed so as to produce the two-fold multiple 2D, the three-fold multiple 3D and the six-fold multiple 6D by different means and store them into registers.

Meanwhile, the selection circuit 106 selects the one-fold multiple D only upon production of the three-fold multiple, but in quotient calculation processing which will be hereinafter described, it always selects the dividend or intermediate remainder R. The addition and subtraction circuit 108 performs addition also only upon production of the three-fold multiple, but in quotient calculation processing, it always performs subtraction between the dividend or intermediate remainder R and a multiple of the divisor selected by the multiple selection circuit 105.

When the three-fold multiple 3D can be produced by some other means, the selection circuit 106 is unnecessary and the subtraction circuit 108 can be constructed as a subtraction circuit which only has a subtraction function. Accordingly, in the description of a quotient calculation operation below, it is assumed that the selection circuit 106 always selects the intermediate remainder R and the subtraction circuit 108 is referred to merely as subtraction circuit.

Referring again to FIG. 2, the dividing apparatus shown further includes an intermediate remainder selection circuit 110, and a second control circuit 109 for controlling the selection operation of the intermediate remainder selection circuit 110, which will be hereinafter described, in response to carry signals (carry signals having information of the positive or negative signs of results of subtraction) from the subtraction circuits 107 and 108.

The intermediate remainder selection circuit 110 selects one of the dividend or intermediate remainder R from the remainder register 101 and results of subtraction by the two subtraction circuits 107 and 108 as a new intermediate remainder R in response to the results of the subtraction by the subtraction circuits 107 and 108 and outputs the new intermediate remainder R to the remainder register 101 by way of the selection circuit 100.

The dividing apparatus further includes a flag circuit 111 for storing and holding the states of carry signals representative of results of subtraction by the subtraction circuits 107 and 108 (each of the signals represents information of the positive or negative sign of a result of subtraction and has the value "1" when the result of the subtraction is in the positive or 0 but has the value "0" when the result of the subtraction is in the negative) as flags C11, C12, C13 and C21, C22, C23. Here, the flags C11 and C21 represent the states of the carry signals from the subtraction circuits 107 and 108 obtained in a first cycle, respectively; the flags C12 and C22 represent the states of the carry signals from the subtraction circuits 107 and 108 obtained in a second cycle, respectively; and the flags C13 and C23 represent the states of the carry signals from the subtraction circuits 107 and 108 obtained in a third cycle, respectively.

The dividing apparatus further includes a quotient determination circuit 112 for determining a quotient of one digit in such a manner as hereinafter described in response to the flags C11, C12, C13 and C21, C22, C23 (that is, the states of the carry signals from the subtraction circuits 107 and 108 obtained in the several processing cycles) stored in the flag circuit 111, and a quotient register 113 for storing the quotient determined by the quotient determination circuit 112.

The second control circuit 109 in the present embodiment also has another function as an error notification circuit which makes a notification of an error when the states of the positive or negative signs of results of subtraction by the two subtraction circuits 107 and 108 provide a logically impossible combination (indicated by the mark * in FIGS. 3 and 4 which will be hereinafter described).

Subsequently, operation of the dividing apparatus of the first embodiment having such a construction as described above with reference to FIG. 2 will be described with reference to FIGS. 3 and 4 in accordance with a flow chart shown in FIG. 5.

FIG. 3 illustrates the relationship between subtraction operations executed in several processing cycles (first to third cycles) in the dividing apparatus of the first embodiment and a result of subtraction (intermediate remainder) to be selected in response to the positive or negative signs of the results of the subtraction, and FIG. 4 illustrates the relationship between the positive and negative signs of results of subtraction and a quotient in the several processing cycles (first to third cycles) in the dividing apparatus of the first embodiment.

First, a dividend R is set into the selection circuit 100 with the uppermost digit thereof, which is not equal to zero, positioned at the leftmost place, and a dividend D is set into the one-fold multiple register 201 of the multiple holding circuit 102 with the uppermost digit thereof, which is not equal to zero, positioned at the leftmost place.

In a first cycle of calculation processing for a quotient of one digit, the multiple selection circuits 104 and 105 are switchably controlled by the first control circuit 103 such that the multiple selection circuit 104 selects the three-fold multiple 3D of the divisor from the multiple holding circuit 102 and the multiple selection circuit 105 selects the six-fold multiple 6D of the divisor from the multiple holding circuit 102.

Figure 5:
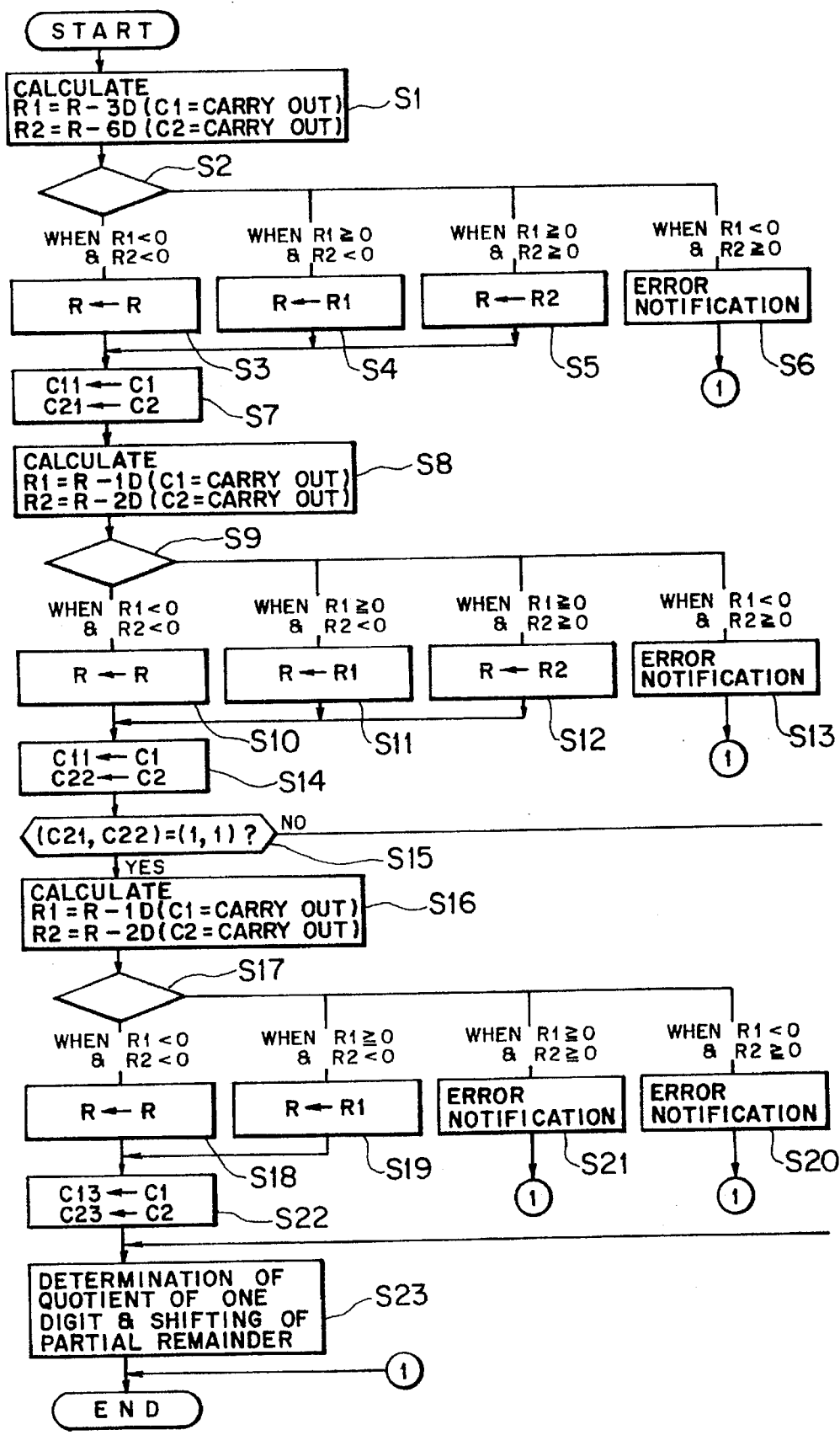
FIG. 5 is a flow chart illustrating operation of the dividing apparatus of FIG. 2.

Consequently, the subtraction circuit 107 executes subtraction between the dividend R and the three-fold multiple 3D of the divisor, that is, R1=R−3D, and simultaneously the subtraction circuit 108 executes subtraction between the dividend R and the six-fold multiple 6D, that is, R2=R−6D (step S1 in FIG. 5).

Here, subtraction of a decimal number is performed, for example, by adding a nines complement of a subtrahend to a minuend by inputting "1" as a carry input to the lowermost digit. In this instance, if the carry output from the uppermost place of the result of addition is "0", then the result of subtraction is in the negative, but if the carry output is "1", the result of subtraction is zero or in the positive (in the following description, zero is included in the positive).

The second control circuit 109 discriminates, in accordance with the carry signals C1 and C2 of the subtraction circuits 107 and 108, the positive or negative signs of the subtraction results R1 and R2 by the two subtraction circuits 107 and 108 (step S2 in FIG. 5), and switchably controls the intermediate remainder selection circuit 110 such that a selected result is stored as an intermediate remainder R into the remainder register 101 by way of the selection circuit 100 (steps S3 to S5 in FIG. 5).

In particular, when R1<0 and R2<0 (that is, C1=C2=0), the intermediate remainder selection circuit 110 selects the dividend R from the remainder register 101 as an intermediate remainder R so that the intermediate remainder R is stored into the remainder register 101 (step S3); when R1≧0 and R2<0 (that is, C1=1 and C2=0), the intermediate remainder selection circuit 110 selects the subtraction result R1 by the subtraction circuit 107 as an intermediate remainder R so that the intermediate remainder R is stored into the remainder register 101 (step S4); and when R1≧0 and R2≧0 (that is, C1=C2=1), the intermediate remainder selection circuit 110 selects the subtraction result R2 from the subtraction circuit 108 as an intermediate remainder R so that the intermediate remainder R is stored into the remainder register 101 (step S5).

It is to be noted that the situation wherein the subtraction result R1 obtained by subtracting the one-fold multiple D of the divisor from the dividend R is in the negative in sign and the subtraction result R2 obtained by subtracting the two-fold multiple 2D of the divisor greater than the one-fold multiple D from the same dividend R is in the positive in sign or zero does not possibly occur and accordingly the combination of the positive and negative signs of R1<0 and R2≧0 is logically impossible.

Therefore, in the present embodiment, if it should be determined at step S2 that R1<1 and R2≧0 (that is, C1=0 and C2=1), then it is determined by the error notification function of the second control circuit 109 that some trouble has occurred in the division processing and an error is notified to an operator or the like by the second control circuit 108 (step S6 in FIG. 5) to assure regular division processing.

In the upper stage of FIG. 3, the relationship between the subtraction operations executed in the first cycle and a result of subtraction to be selected in response to the positive or negative signs of results of the subtraction is illustrated.

The states of the carry signals C1 and C2 outputted from the selection circuits 107 and 108 as a result of the subtraction processing at step S1 are stored as flags C11 and C21 into the flag circuit 111, respectively (step S8 in FIG. 5).

Subsequently in a second cycle of the calculation processing for a quotient of one digit, the multiple selection circuits 104 and 105 are switchably controlled by the first control circuit 103 such that the multiple selection circuit 104 selects the one-fold multiple D of the divisor from the multiple holding circuit 102 while the multiple selection circuit 105 selects the two-fold multiple 2D of the divisor from the multiple holding circuit 102.

Consequently, the subtraction circuit 107 executes subtraction between the intermediate remainder R and the one-fold multiple D of the divisor, that is, R1=R−D, and simultaneously, the subtraction circuit 108 executes subtraction between the intermediate remainder R and the two-fold multiple 2D, that is, R2=R−2D (step S8 in FIG. 5).

The control circuit 109 discriminates, similarly as in the first cycle, the positive or negative signs of the subtraction results R1 and R2 by the two subtraction circuits 107 and 108 in response to the carry signals C1 and C2 of the subtraction circuits 107 and 108 (step S9 in FIG. 5), and switchably controls the intermediate remainder selection circuit 110 such that a selected result is stored as a new intermediate remainder R into the remainder register 101 again by way of the selection circuit 100 (steps S10 to S12 in FIG. 5).

In particular, similarly as at steps S3 to S5 described hereinabove, when R1<0 and R2<0 (that is, C1=C2=0), the intermediate remainder selection circuit 110 selects the dividend R from the remainder register 101 as an intermediate remainder R so that the intermediate remainder R is stored into the remainder register 101 (step S10); when R1≧0 and R2<0 (that is, C1=1 and C2=0), the intermediate remainder selection circuit 110 selects the subtraction result R1 by the subtraction circuit 107 as an intermediate remainder R so that the intermediate remainder R is stored into the remainder register 101 (step S11); or when R1≧0 and R2≧0 (that is, C1=C2=1), the intermediate remainder selection circuit 110 selects the subtraction result R2 from the subtraction circuit 108 as an intermediate remainder R to be stored into the remainder register 101 (step S12).

Also here, as described hereinabove in connection with step S6, if it should be determined at step S9 that R1<0 and R2≧0 (that is, C1=0 and C2=1), it is determined that some trouble has occurred in the division processing and an error is notified to an operator or the like by the error notification function of the second control circuit 109 (step S13 in FIG. 5) to assure regular division processing.

It is to be noted that, at the middle stage in FIG. 3, the relationship between the subtraction operations executed in the second cycle and a subtraction result to be selected in response to the positive or negative signs of the results of the subtraction is illustrated.

Then, the states of the carry signals C1 and C2 outputted from the subtraction circuits 107 and 108 as a result of the subtraction processing at step S8 are stored as flags C12 and C22 into the flag circuit 111, respectively (step S14 in FIG. 5).

Here, as can be seen from the relationship between the positive or negative signs of results of subtraction in the processing cycles and a quotient illustrated in FIG. 4, when the quotient is one of "0" to "7", the quotient is settled by results of subtraction in the first and second cycles.

Accordingly, if it is determined in the second cycle that the quotient is settled in response to the states (flags C11 and C21) of the carry signals C1 and C2 of the first cycle and the states (flags C12 and C22) of the carry signals C1 and C2 in the second cycle, that is, if it is determined at step S15 in FIG. 5 that both of the flags C21 and C22 stored in the flag circuit 111 are not equal to 1 [(C12, C22): (0, 0), (1, 0) or (0, 1)], the quotient calculation operation is completed with the second cycle and another quotient calculation operation for a next digit is started.

In this instance, the result to be stored from the intermediate remainder selection circuit 110 into the remainder register 101 is actually stored after it is shifted leftwardly by one place to allow subsequent quotient calculation processing. Further, the quotient determination circuit 112 determines a quotient of one digit in accordance with FIG. 4 based on the flags C11, C12 and C21, C22 of the flag circuit 111 and stores the thus determined quotient into the quotient register 113 (step S23 in FIG. 5).

On the other hand, as can be seen from FIG. 4, if the quotient is "8" or "9", that is, if it is determined at step S15 in FIG. 5 that both of the flags C21 and C22 stored in the flag circuit 111 are 1 [(C21, C22)=(1, 1)], since the quotient is not settled as yet, processing of a third cycle is performed. In this instance, the output of the intermediate remainder selection circuit 110 is stored into the remainder register 101 without being shifted, whereafter processing of the third cycle is started.

In the third cycle of calculation processing for a quotient of one digit, similarly as at step S8 in the second cycle, the subtraction circuit 107 executes subtraction between the intermediate remainder R and the one-fold multiple D of the divisor, that is, R1=R−D, and simultaneously the subtraction circuit 108 executes subtraction between the intermediate remainder R and the two-fold multiple 2D, that is, R2=R−2D (step S16 of FIG. 5).

Then, also the second control circuit 109 determines, similarly as in the second cycle, the positive or negative signs of the subtraction results R1 and R2 by the two subtraction circuits 107 and 108 in accordance with the carry signals C1 and C2 of the subtraction circuits 107 and 108 (step S17 of FIG. 5), and when R1<0 and R2<0 (that is, C1=C2=0), the intermediate remainder selection circuit 110 selects the dividend R from the remainder register 101 as an intermediate remainder R to be stored into the remainder register 101 (step S18 of FIG. 5), but when R1≧0 and R2<0 (that is, C1=1 and C2=0), the intermediate remainder selection circuit 110 selects the subtraction result R1 by the subtraction circuit 107 as an intermediate remainder R to be stored into the remainder register 101 (step S19).

Also here, as described hereinabove in connection with step S6, if it should be determined at step S17 that R1<0 and R2≧0 (that is, C1=0 and C2=1), then it is determined that some trouble has occurred in the division processing and an error is notified to an operator or the like by the error notification function of the second control circuit 109 (step S21 of FIG. 5) to assure regular division processing.

Further, here, also when it is determined at step S17 that R1≧0 and R2≧0 (that is, C1=C2=1), it is determined that some trouble has occurred in the division processing and an error is notified to an operator or the like by the error notification function of the second control circuit 109 (step S20 of FIG. 5). This is because, in the third cycle, that R1≧0 and R2≧0 (that is, C1=C2=1) stands when the quotient is greater than "9", but this is logically impossible.

It is to be noted that, at the lower stage of FIG. 3, the relationship between the subtraction operations executed in the third cycle and a result of subtraction to be selected in response to the positive or negative signs of results of the subtraction is illustrated.

Then, the states of the carry signals C1 and C2 outputted from the subtraction circuits 107 and 108 as a result of the subtraction processing at step S16 are stored as flags C13 and C23 into the flag circuit 111 (step S22 of FIG. 5).

According to the dividing apparatus of the present embodiment, a quotient is settled completely with results of subtraction up to the third cycle. Accordingly, a calculation operation for a quotient of one digit is completed in three cycles to the utmost, and thereafter, a calculation operation for another quotient of a next digit is started.

In this instance, the result stored in the remainder register 101 is shifted by one place leftwardly to allow subsequent calculation processing for a next quotient. Further, the quotient determination circuit 112 determines a quotient of one digit in accordance with FIG. 4 based on the flags C11, C12, C21, C22, C13 and C23 of the flag circuit 111 and stores the thus determined quotient into the quotient register 113 (step S23 of FIG. 5).

Here, as a more detailed example, the case wherein the quotient is "5" will be described. In the present embodiment, when the three-fold multiple 3D and the six-fold multiple 6D are individually subtracted simultaneously from the dividend R in the first cycle, the subtraction result R2 of the six-fold multiple 6D has the negative sign and the subtraction result R1 of the three-fold multiple 3D has the positive sign, and accordingly, it is discriminated that the quotient is within the range from "3" to "5".

Subsequently in the second cycle, subtraction operations of the two-fold multiple 2D and the one-fold multiple D from the result (intermediate remainder) R of the subtraction of the three-fold multiple 3D are individually performed simultaneously. As a result, since the subtraction result R2 of the two-fold multiple 2D has the positive sign, the quotient is equal to or higher than "5", and since the result in the first cycle exhibits that the quotient ranges from "3" to "5", the quotient is settled to be equal to "5" (C11=1, C21=0, C12=1 and C22=1 in the flag circuit 111). In this manner, by simultaneously performing subtractions of two multiples from a dividend or intermediate remainder R, the range of a quotient is successively reduced to finally settle a quotient of one digit.

Further, in the present embodiment, the kinds of integer multiples of a divisor are characteristic. In order to settle a quotient in two cycles, it is required that multiples from a one-fold multiple to a nine-fold multiple be represented by a sum of two multiples. The one-fold multiple, the two-fold multiple, the three-fold multiple and the six-fold multiple in the present embodiment satisfy the requirement as seen from below.

9-fold multiple=6-fold multiple+3-fold multiple
8-fold multiple=6-fold multiple+2-fold multiple 7-fold multiple=6-fold multiple+1-fold multiple
6-fold multiple=6-fold multiple
5-fold multiple=3-fold multiple+2-fold multiple
4-fold multiple=3-fold multiple+1-fold multiple
3-fold multiple=3-fold multiple
2-fold multiple=2-fold multiple
1-fold multiple=1-fold multiple On the other hand, for example, according to the combination of the one-fold multiple, the two-fold multiple, the four-fold multiple and the eight-fold multiple, the seven-fold multiple cannot be represented by a sum of two multiples as seen from below.

9-fold multiple=8-fold multiple+1-fold multiple
8-fold multiple=3-fold multiple
7-fold multiple=4-fold multiple+2-fold multiple+1-fold multiple
6-fold multiple=4-fold multiple+2-fold multiple
4-fold multiple=4-fold multiple
3-fold multiple=2-fold multiple+1-fold multiple
2-fold multiple=2-fold multiple
1-fold multiple=1-fold multiple In this manner, according to the dividing apparatus of the first embodiment of the present invention, by subtracting, using the one-fold multiple D, the two-fold multiple 2D, the three-fold multiple 3D and the six-fold multiple 6D as integer multiples of a divisor, the three-fold multiple 3D and the six-fold multiple 6D from a dividend in a first cycle, it is determined to which one of the ranges including ① the range of "2" or less, ② the range from "3" to "5" and ③ the range equal to or higher than "6" the quotient belongs, and thereafter, by subtracting the one-fold multiple D and the two-fold multiple 2D from an intermediate remainder in the second cycle or the second and following cycles, a quotient can be determined in each of the ranges.

Accordingly, also as seen from FIG. 4, when the quotient is equal to or smaller than "7", the quotient of one digit can be calculated in two cycles, but when the quotient is "8" or "9", the quotient of one digit can be calculated in three cycles, and consequently, calculation processing for a quotient of one digit can be completed in three cycles in the maximum and in two cycles in the minimum and in 2.2 cycles on the average. Accordingly, the processing time for settling a quotient of one digit can be reduced with a simplified logic construction, and decimal division can be performed at a remarkably high speed.

Further, in the present embodiment, since the multiple holding circuit 102 is constituted from the one-fold multiple register 201, the three-fold multiple register 202 and the two doubling circuits 203 and 204, means for holding the one-fold multiple D, the two-fold multiple 2D, the three-fold multiple 3D and the six-fold multiple 6D can be constructed readily.

Furthermore, since the subtraction circuit 108 has an addition function and the dividing apparatus includes the selection circuit 106 for selecting one of the dividend R from the remainder register 101 and the one-fold multiple D of the divisor from the one-fold multiple register 201 and outputting the thus selected value to the subtraction circuit 108, the three-fold multiple 3D of the divisor to be stored into the three-fold multiple register 202 can be calculated readily by addition of the one-fold multiple D of the divisor selected by the selection circuit 106 and the two-fold multiple 2D of the divisor selected by the multiple selection circuit 105.

In addition, where the states of the positive or negative signs of the subtraction results R1 and R2 by the two subtraction circuits 107 and 108 exhibit a logically impossible combination, an error is notified to an operator or the like by the error notification function of the second control circuit 109, and accordingly, the dividing apparatus of the present embodiment is advantageous in that regular division processing can be assured and the reliability in division processing can be enhanced.

c. Second Embodiment

Figure 6:
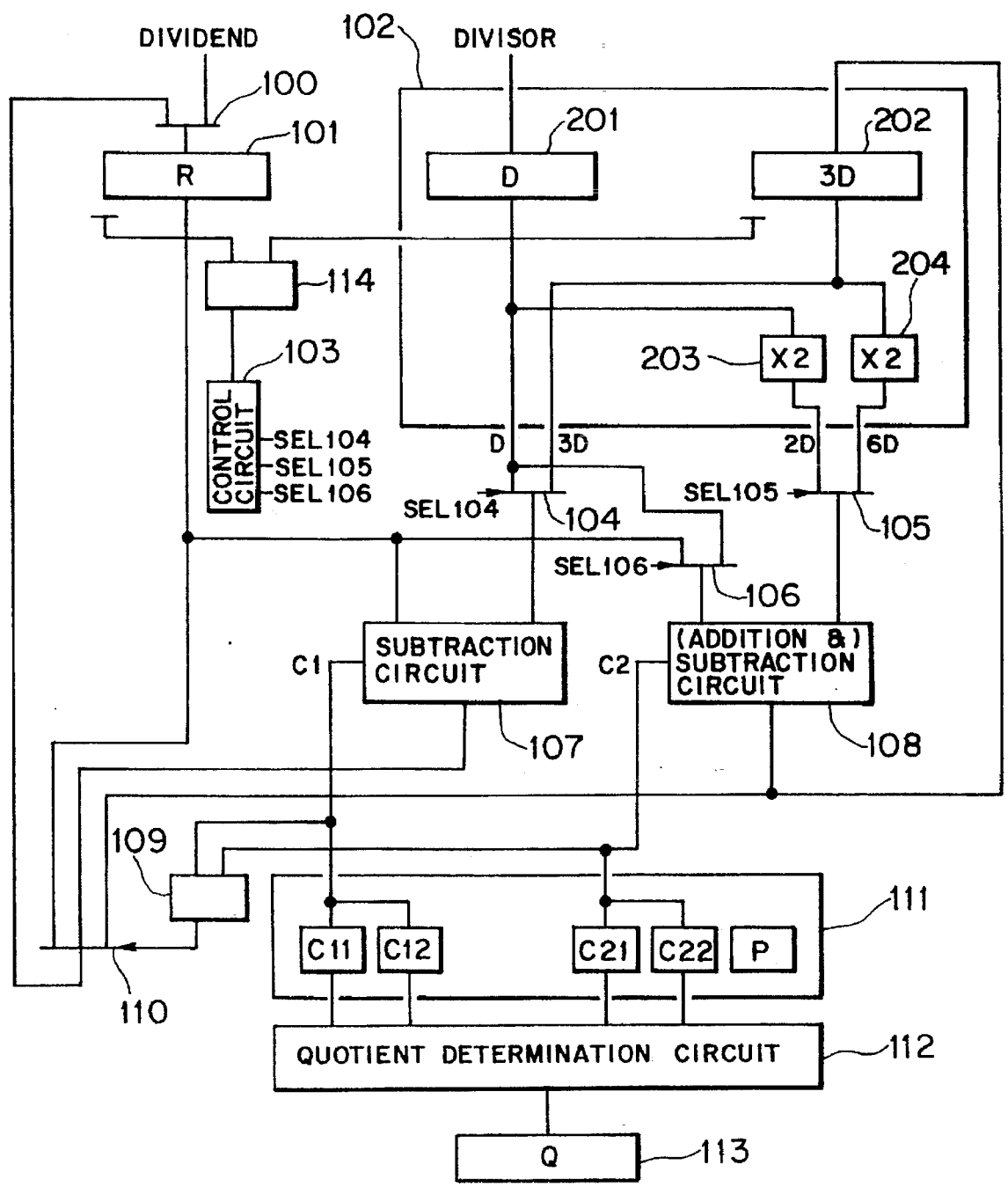
FIG. 6 is a block diagram of another dividing apparatus showing a second preferred embodiment of the present invention.

Referring now to FIG. 6, there is shown a dividing apparatus according to a second preferred embodiment of the present invention. The dividing apparatus of the present embodiment is a modification to and includes common components to those of the dividing apparatus of the first embodiment described above, and overlapping description of the common components is omitted herein to avoid redundancy.

The dividing apparatus of the present embodiment is different from the dividing apparatus of the first embodiment only in that it additionally includes a comparison circuit 114. The comparison circuit 114 compares, upon starting of the second cycle of calculation processing for a quotient of one digit, two upper digits r of the intermediate remainder R held in the remainder register 101 and two upper digits $3d$ of the three-fold multiple 3D of the divisor held in the three-fold multiple register 202 of the multiple holding circuit 102 with each other, notifies to the first control circuit 103 whether the three-fold multiple 3D is higher (hereinafter denoted as $r<3d$) or the intermediate remainder R is higher or equal (hereinafter denoted as $r \geq 3d$), and sets a magnitude comparison flag P (P=1 when $r \geq 3d$) of the flag circuit 111. Here, the comparison in magnitude by the comparison circuit 114 is sufficient only with lower 6 bits of the two upper digits (8 bits).

The first control circuit 103 in the present embodiment selects, when it is determined in the second cycle by the comparison circuit 114 that $r \geq 3d$, the three-fold multiple 3D of the divisor from the multiple holding circuit 102 by way of the multiple selection circuit 104 and outputs the thus selected three-fold multiple 3D of the divisor to the subtraction circuit 107, but selects, when it is determined by the comparison circuit 114 that $r<3d$, the one-fold multiple D of the divisor from the multiple holding circuit 102 by way of the multiple selection circuit 104 and outputs the thus selected one-fold multiple D of the divisor to the subtraction circuit 107.

Further, in the flag circuit 111 in the present embodiment, similarly as in the first embodiment, the states of the carry signals from the subtraction circuits 107 and 108 obtained in the first cycle are held as the flags C11 and C21 while the states of the carry signals of the subtraction circuits 107 and 108 obtained in the second cycle are held as the flags C12 and C22, but the flags C13 and C23 corresponding to the third cycle are not held and a result of comparison by the comparison circuit 114 is held as a magnitude comparison flag P instead. The magnitude comparison flag P is set to "1" when it is determined by the comparison circuit 114 that $r \geq 3d$, but is set to "0" when it is determined that $r<3d$.

Subsequently, operation of the dividing apparatus of the second embodiment having the construction shown in FIG. 6 will be described with reference to FIGS. 7 and 8 in accordance with the flow chart shown in FIG. 9.

FIG. 7 illustrates the relationship between the subtraction operations executed in difference processing cycles (first and second cycles) and a result of subtraction (intermediate remainder) selected in response to the positive or negative signs of results of the subtraction in the dividing apparatus of the second embodiment, and FIG. 8 illustrates the relationship between the positive or negative signs of results of subtraction and a quotient in each processing cycle (first or second cycle) in the dividing apparatus of the second embodiment.

First, functional differences of the dividing apparatus of the second embodiment from the dividing apparatus of the first embodiment will be described in detail.

In the dividing apparatus of the first embodiment, when the quotient is within the range equal to or higher than "6", there are four candidates of "6" to "9" for the quotient as seen from FIG. 4, and accordingly, if subtraction is performed using two multiples of the one-fold multiple and the two-fold multiple in the second cycle, then processing of a further one cycle (totaling three cycles) is required in order to settle the quotient between "8" and "9"

Thus, in the dividing apparatus of the second embodiment, the two upper digits r of the intermediate remainder R of the remainder register 101 and the two upper digits $3d$ of the three-fold multiple 3D of the divisor of the multiple holding circuit 102 are compared with each other by the comparison circuit 114, and in response to the relationship in magnitude between them, the multiple to be selected by the multiple selection circuit 104 is changed over between the one-fold multiple D and the three-fold multiple 3D by the first control circuit 103 to change over the multiple to be subtracted in the second cycle to the two-fold multiple 2D and the three-fold multiple 3D or to the one-fold multiple D and the two-fold multiple 2D.

In particular, as seen from FIG. 8, when $r \geq 3d$, the quotient can be particularized to be equal to or higher than "8", that is, "8" or "9", and by individually subtracting the two-fold multiple 2D and the three-fold multiple 3D from the intermediate remainder R by means of the subtraction circuit 108 and 107, respectively, the quotient can be particularized to "8" or "9". On the other hand, when $r<3d$, it can be particularized that the quotient is within the range of ① or ② described in the description of the first embodiment or within the range of "6" to "8" of the range ③. Since any of the ranges includes three candidates for the quotient, the quotient can be particularized by subtracting the one-fold multiple D and the two-fold multiple 2D from the intermediate remainder R by means of the subtraction circuits 107 and 108, respectively.

Also in the dividing apparatus of the second embodiment, upon division processing, a dividend R is first set into the remainder register 101 by way of the selection circuit 100 with the uppermost digit thereof, which is not equal to zero, positioned at the leftmost place, and a divisor D is set into the one-fold multiple register 201 of the multiple holding circuit 102 with the uppermost digit thereof, which is not equal to zero, positioned at the leftmost place.

In the first cycle of calculation processing for a quotient of one digit, processing quite same as that in the first embodiment is performed. The processes at steps S31 to S37 in the second embodiment illustrated in FIG. 9 are quite same as the processes at steps S1 to S7 in the first embodiment illustrated in FIG. 5, respectively, and accordingly, overlapping description of them is omitted herein to avoid redundancy. It is to be noted that, at the upper stage in FIG. 7, the relationship between the subtraction operations executed in the first cycle and a result of subtraction to be selected in response to the positive or negative signs of results of the subtraction is illustrated.

Figure 9:
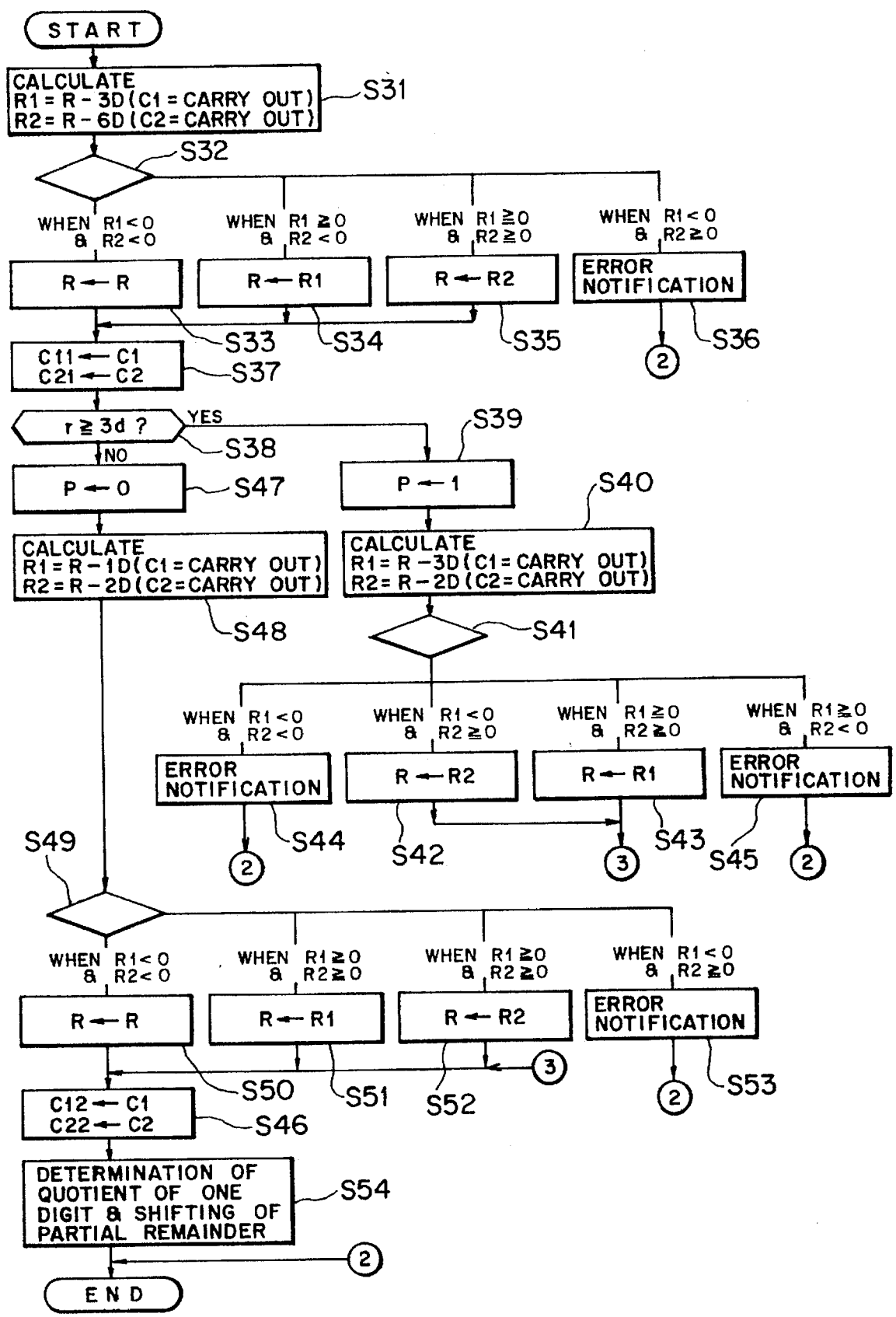
FIG. 9 is a flow chart illustrating operation of the dividing apparatus of FIG. 6.

Then, in the second embodiment, upon starting of the second cycle of calculation processing for a quotient of one digit, the comparison circuit 114 compares the two upper digits of the intermediate remainder r of the remainder register 101 and the two upper digits $3d$ of the three-fold multiple 3D of the multiple holding circuit 102 with each other (step S38 of FIG. 9).

If the result of comparison reveals that $r \geq 3d$ (when the determination at step S38 is YES), the magnitude comparison flag P=1 is placed into the flag circuit 111 (step S39 of FIG. 9). Thereafter, the multiple selection circuits 104 and 105 are switchably controlled by the first control circuit 103 such that the multiple selection circuit 104 selects the threefold multiple 3D of the divisor from the multiple holding circuit 102 while the multiple selection circuit 105 selects the two-fold multiple 2D of the divisor from the multiple holding circuit 102.

Consequently, the subtraction circuit 107 executes subtraction between the intermediate remainder R and the three-fold multiple 3D of the divisor, that is, R1=R–3D, and the subtraction circuit 108 executes subtraction between the intermediate remainder R and the two-fold multiple 2D, that is, R2=R–2D (step S40 of FIG. 9).

Then, the control circuit 109 discriminates, substantially similarly as in the first embodiment, the positive or negative signs of the subtraction results R1 and R2 of the subtraction circuits 107 and 108 in accordance with the carry signals C1 and C2 of the subtraction circuits 107 and 108 (step S41 of FIG. 9), and when R1<0 and R2≧0 (that is, C1=0 and C2=1), the intermediate remainder selection circuit 110 selects the subtraction result R2 from the subtraction circuit 108 as an intermediate remainder R and stores the intermediate remainder R into the remainder register 101 (step S42 of FIG. 9), but when R1≧0 and R2≧0 (that is, C1=C2=1), the intermediate remainder selection circuit 110 selects the subtraction result R1 from the subtraction circuit 108 as an intermediate remainder R and stores the intermediate remainder R into the remainder register 101 (step S19).

It is to to be noted that, as described in connection with step S6 in the first embodiment, if it should be determined at step S41 that R1≧0 and R2<0 (that is, C1=1 and C2=0), it is determined that some trouble has occurred in the division processing and an error is notified to an operator or the like by the error notification function of the second control circuit 109 (step S45 of FIG. 9) to assure regular division processing. Here, since the relationship in magnitude between the multiples to be subtracted by the subtraction circuits 107 and 108 is reverse to that in the first embodiment, also the relationship of the signs of inequality is reversed.

Further, also here, when it is determined at step S41 that R1<0 and R2<0 (that is, C1=C2=0), it is determined that some trouble has occurred in the division processing and an error is notified to an operator or the like by the error notification function of the second control circuit 109 (step S44 in FIG. 9). This is because, when it is determined by the comparison circuit 114 that $r \triangle 3d$, that R1<0 and R2<0 (that is, C1=C2=0) corresponds to the case wherein the quotient is smaller than "8", but this is logically impossible.

It is to be noted that, at the middle stage of FIG. 7, the relationship between the subtraction operations executed in the second cycle when $r \geq 3d$ and a result of subtraction to be selected in response to the positive or negative signs of results of the subtraction is illustrated.

Then, the states of the carry signals C1 and C2 outputted from the subtraction circuits 107 and 108 as a result of the subtraction processing at step S40 are stored as flags C12 and C22 into the flag circuit 111, respectively (step S46 of FIG. 9).

On the other hand, if it is determined by the comparison circuit 114 upon starting of the second cycle that $r<3d$ (when the determination at step S38 is NO), the magnitude comparison flag P=0 is placed into the flag circuit 111 (step S47 of FIG. 9), and then the multiple selection circuits 104 and 105 are switchably controlled by the first control circuit 103 such that the multiple selection circuit 104 selects the one-fold multiple D of the divisor from the multiple holding circuit 102 while the multiple selection circuit 105 selects the two-fold multiple 2D of the divisor from the multiple holding circuit 102.

Consequently, the subtraction circuit 107 executes subtraction between the intermediate remainder R and the one-fold multiple D of the divisor, that is, R1=R−D, and simultaneously, the subtraction circuit 108 executes subtraction between the intermediate remainder R and the two-fold multiple 2D, that is, R2=R−2D (step S48 of FIG. 9).

Then, since the processes at steps S49 to S53 and S46 of FIG. 9 by the control circuit 109 are quite same as the processes at steps S9 to S14 in the first embodiment illustrated in FIG. 5, respectively, overlapping description of them will be omitted herein to avoid redundancy. It is to be noted that, at the lower stage of FIG. 7, the relationship between the subtraction operations executed when r<3d in the second cycle and a result of subtraction to be selected in accordance with the positive or negative signs of results of the subtraction is illustrated.

According to the dividing apparatus of the present embodiment, as can be seen from FIG. 8, a quotient is settled completely by results of subtraction up to the second cycle. Accordingly, the calculation operation of a quotient of one digit is completed in fixed two cycles, and a calculation operation for a quotient of a next digit is started.

In this instance, the result to be stored into the remainder register 101 is shifted leftwardly by one place to allow calculation processing for a next quotient. Further, the quotient determination circuit 112 determines a quotient of one digit in accordance with FIG. 8 based on the magnitude comparison flag P representing whether or not r≧3d has been determined in the second cycle, and stores the thus determined quotient into the quotient register 113 (step S54 of FIG. 9).

In this manner, according to the second embodiment of the present invention, similar advantages to those of the first embodiment can be achieved. Further, in the second embodiment, by comparing the two upper digits r of the intermediate remainder R and the two upper digits 3d of the three-fold multiple 3D with each other by means of the comparison circuit 114 and switchably selecting a multiple to be subtracted in response to the relationship in magnitude between them, calculation processing of a quotient of one digit can be performed in fixed two cycles, and accordingly, the processing time is further reduced comparing with that of the first embodiment and decimal division can be performed at a remarkably higher speed.

It is to be noted that, while, in the embodiments described above, quotient calculation processing and storage processing of a quotient into the quotient register 113 are performed in different cycles, since storage of a quotient and the first cycle of quotient calculation processing can be executed simultaneously, calculation of a quotient per one digit can be executed in two or three cycles in the first embodiment whereas calculation of a quotient per one digit can be executed in fixed two cycles in the second embodiment. Further, in any embodiment, it is readily possible to modify the dividing apparatus such that, when a quotient is settled in the second cycle or the third cycle, simultaneously the quotient is stored into the quotient register 113.

Further, while, in the embodiments described above, the number of multiples to be held by the multiple holding circuit 102 is four including a one-fold multiple, a two-fold multiple, a three-fold multiple and a six-fold multiple, the present invention is not limited to the specific case, but various combinations may possibly be applied including, for example, a combination of a one-fold multiple, a two-fold multiple, a five-fold multiple and an eight-fold multiple, another combination of a one-fold multiple, a two-fold multiple, a four-fold multiple and an eight-fold multiple, and a further combination of a one-fold multiple, a two-fold multiple, a three-fold multiple, a four-fold multiple and an eight-fold multiple. In any of the combinations listed above, similarly as in the embodiments described above, calculation processing of a quotient of one digit can be performed in two or three cycles, and similar advantages to those of the embodiments described above can naturally be achieved.

Furthermore, while, in the embodiments described above, two subtraction circuits are provided to subtract two different multiples of a divisor at a time, the present invention is not limited to the specific construction, and if there is no problem in terms of hardware or the production cost, three or more subtraction circuits may be provided to subtract three or more different multiples of a divisor at a time. However, the construction described above which includes two subtraction circuits is advantageous in that it is most simple in hardware construction and is lowest in production cost and efficient division processing can be performed.

The present invention is not limited to the specifically described embodiment, and variations and modifications may be made without departing from the scope of the present invention.

What is claimed is:

1. A dividing apparatus, comprising:

a remainder register for holding a dividend or an intermediate remainder;

multiple holding means for holding a plurality of different integer multiples of a divisor;

a plurality of subtraction circuits for individually subtracting different ones of the integer multiples from the dividend or intermediate remainder of said remainder register;

a plurality of multiple selection circuits for individually selecting different ones of the integer multiples held in said multiple holding means and outputting the selected integer multiples to said subtraction circuits;

a first control circuit for switchably controlling those of the integer multiples to be selected by said multiple selection circuits;

a flag circuit for storing the states of carry signals from said subtraction circuits as flags;

an intermediate remainder selection circuit for selecting one of the dividend or intermediate remainder from said remainder register and results of the subtraction by said subtraction circuits as a new intermediate remainder and outputting the new intermediate remainder to said remainder register;

a second control circuit for switchably controlling the intermediate remainder to be selected by said intermediate remainder selection circuit in response to the carry signals from said subtraction circuits; and a quotient determination circuit for determining a quotient of one digit in accordance with the states of the carry signals from said subtraction circuits stored in said flag circuit; and wherein:

in a first processing cycle, said multiple selection circuits are switchably controlled by said first control circuit such that a plurality of suitable ones of the integer multiples from said multiple holding means are individually selected by said multiple selection circuits and outputted to said subtraction circuits;

the suitable integer multiples selected by said multiple selection circuits are simultaneously subtracted from the dividend or intermediate remainder of said remainder register individually by said subtraction circuits;

said intermediate remainder selection circuit is switchably controlled in response to the carry signals from said subtraction circuits by said second control circuit such that, when all of the results of the subtraction by said subtraction circuits are in the negative in sign, said intermediate remainder selection circuit selects the dividend or intermediate remainder from said remainder register as a new intermediate remainder and outputs the new intermediate remainder to said remainder register, but when some or all of the results of the subtraction by said subtraction circuits are in the positive in sign or zero, said intermediate remainder selection circuit selects that one of those results of the subtraction having the positive sign or the value of zero which corresponds to a highest one of the multiples as a new intermediate remainder and outputs the new intermediate remainder to said remainder register; and the states of the carry signals from said subtraction circuits are successively stored as flags into said flag circuit.

2. A dividing apparatus as claimed in claim 1, wherein said multiple holding means holds at least four different multiples including a one-fold multiple and a two-fold multiple as the integer multiples of the divisor, and said subtraction circuits and said multiple selection circuits are each provided by a pair, and wherein:

in a first cycle of calculation processing for a quotient of one digit, the two multiple selection circuits are switchably controlled by said first control circuit such that those two of the integer multiples from said multiple holding means which are higher than the twofold multiple are individually selected by said two multiple selection circuits and outputted to the two subtraction circuits;

the two integer multiples selected by said two multiple selection circuits are simultaneously subtracted individually from the dividend of said remainder register by said two subtraction circuits;

said intermediate remainder selection circuit is switchably controlled in response to the carry signals from said two subtraction circuits by said second control circuit such that, when both of the results of the subtraction by said two subtraction circuits are in the negative in sign, said intermediate remainder selection circuit selects the dividend from said remainder register as an intermediate remainder and outputs the intermediate remainder to said remainder register, but when one of the results of the subtraction by said two subtraction circuits is in the positive in sign or zero, said intermediate remainder selection circuit selects that one of the two results of the subtraction which has the positive sign or the value of zero as an intermediate remainder and outputs the intermediate remainder to said remainder register, but otherwise when both of the results of the subtraction by said two subtraction circuits are in the positive in sign or zero, said intermediate remainder selection circuit selects that one of the results of the subtraction which corresponds to a highest one of the multiples as an intermediate remainder and outputs the intermediate remainder to said remainder register; and the states of the carry signals from said two subtraction circuits are stored as flags into said flag circuit; and in a second cycle or second and following cycles of the calculation processing for a quotient of one digit, said two multiple selection circuits are switchably controlled by said first control circuit such that the one-fold multiple and the two-fold multiple from said multiple holding means are individually selected by said two multiple selection circuits and outputted to said two subtraction circuits;

the one-fold multiple and the two-fold multiple selected by said two multiple selection circuits are simultaneously subtracted individually from the intermediate remainder of said remainder register by said two subtraction circuits;

said intermediate remainder selection circuit is switchably controlled in response to the carry signals from said two subtraction circuits by said second control circuit such that, when both of the results of the subtraction by said two subtraction circuits are in the negative in sign, said intermediate remainder selection circuit selects the intermediate remainder from said remainder register as a new intermediate remainder and outputs the new intermediate remainder to said remainder register, but when one of the results of the subtraction by said two subtraction circuits is in the positive in sign or zero, said intermediate remainder selection circuit selects that one of the two results of the subtraction which has the positive sign or the value of zero as a new intermediate remainder and outputs the new intermediate remainder to said remainder register, but otherwise when both of the results of the subtraction by said two subtraction circuits are in the positive in sign or zero, said intermediate remainder selection circuit selects the result of the subtraction of the two-fold multiple as a new intermediate remainder and outputs the new intermediate remainder to said remainder register; and the states of the carry signals from said two subtraction circuits are stored as flags into said flag circuit.

3. A dividing apparatus as claimed in claim 2, wherein said multiple holding means holds four multiples including a one-fold multiple, a two-fold multiple, a three-fold multiple and a six-fold multiple as the integer multiples of the divisor.

4. A dividing apparatus as claimed in claim 3, wherein said multiple holding means includes:

a one-fold multiple register for holding the one-fold multiple of the divisor;

a three-fold multiple register for holding the three-fold multiple of the divisor;

a first doubling circuit for multiplying the one-fold multiple from said one-fold multiple register by two to obtain the two-fold multiple of the divisor and outputting the two-fold multiple of the divisor; and a second doubling circuit for multiplying the three-fold multiple from said three-fold multiple register by two to obtain the six-fold multiple of the divisor and outputting the six-fold multiple of the divisor.

5. A dividing apparatus as claimed in claim 4, wherein one of said two subtraction circuits is constructed as an addition and subtraction circuit having an addition function, and further comprising a selection circuit for selecting one of the dividend from said remainder register and the one-fold multiple of the divisor from said one-fold multiple register and outputting the selected value to said addition and subtraction circuit, and wherein said addition and subtraction circuit adds the one-fold multiple of the divisor from said first one-fold register selected by and inputted from said selection circuit and the two-fold multiple of the divisor from said first doubling circuit selected by and inputted from one of said two multiple selection circuits to calculate the three-fold multiple of the divisor and stores the thus calculated three-fold multiple into said three-fold multiple register.

6. A dividing apparatus as claimed in claim 5, further comprising an error notification circuit for notifying an error when the states of the positive or negative signs of the results of the subtraction by said two subtraction circuits provide a logically impossible combination.

7. A dividing apparatus as claimed in claim 4, further comprising an error notification circuit for notifying an error when the states of the positive or negative signs of the results of the subtraction by said two subtraction circuits provide a logically impossible combination.

8. A dividing apparatus as claimed in claim 3, further comprising an error notification circuit for notifying an error when the states of the positive or negative signs of the results of the subtraction by said two subtraction circuits provide a logically impossible combination.

9. A dividing apparatus as claimed in claim 2, further comprising an error notification circuit for notifying an error when the states of the positive or negative signs of the results of the subtraction by said two subtraction circuits provide a logically impossible combination.

10. A dividing apparatus as claimed in claim 1, wherein said multiple holding means holds four multiples including a one-fold multiple, a two-fold multiple, a three-fold multiple and a six-fold multiple as the integer multiples of the divisor, and said subtraction circuits and said multiple selection circuits are each provided by a pair, and further comprising a comparison circuit for comparing, upon starting a second cycle of calculation processing for a quotient of one digit, two upper digits of the intermediate remainder held in said remainder register with two upper digits of the three-fold multiple of the divisor held in said multiple holding means to determine the relationship in magnitude between them and notifying the relationship in magnitude to said first control circuit, and wherein:

in a first cycle of the calculation processing for a quotient of one digit, the two multiple selection circuits are switchably controlled by said first control circuit such that the three-fold multiple and the six-fold multiple from said multiple holding means are individually selected by said two multiple selection circuits and outputted to the two subtraction circuits;

the three-fold multiple and the six-fold multiple selected by said two multiple selection circuits are simultaneously subtracted individually from the dividend of said remainder register by said two subtraction circuits;

said intermediate remainder selection circuit is switchably controlled in response to the carry signals from said two subtraction circuits by said second control circuit such that, when both of the results of the subtraction by said two subtraction circuits are in the negative in sign, said intermediate remainder selection circuit selects the dividend from said remainder register as an intermediate remainder and outputs the intermediate remainder to said remainder register, but when one of the results of the subtraction by said two subtraction circuits is in the positive in sign or zero, said intermediate remainder selection circuit selects that one of the two results of the subtraction which has the positive sign or the value of zero as an intermediate remainder and outputs the intermediate remainder to said remainder register, but otherwise when both of the results of the subtraction by said two subtraction circuits are in the positive in sign or zero, said intermediate remainder selection circuit selects the result of the subtraction of the six-fold multiple as an intermediate remainder and outputs the intermediate remainder to said remainder register; and the states of the carry signals from said two subtraction circuits are stored as flags into said flag circuit; and in a second cycle of the calculation processing for a quotient of one digit, the two upper digits of the intermediate remainder held by said remainder register are first compared with the two upper digits of the three-fold multiple of the divisor held in said multiple holding means by said comparison circuit, and when the comparison by said comparison circuit proves that the two upper digits of the intermediate remainder are equal to or higher than the two upper digits of the three-fold multiple of the divisor, said two multiple selection circuits are switchably controlled by said first control circuit such that the two-fold multiple and the three-fold multiple from said multiple holding means are individually selected by said two multiple selection circuits and outputted to said two subtraction circuits;

the two-fold multiple and the three-fold multiple selected by said two multiple selection circuits are simultaneously subtracted individually from the intermediate remainder of said remainder register by said two subtraction circuits;

said intermediate remainder selection circuit is switchably controlled in response to the carry signals from said two subtraction circuits by said second control circuit such that, when one of the results of the subtraction by said two subtraction circuits is in the positive in sign or zero, said intermediate remainder selection circuit selects that one of the two results of the subtraction which has the positive sign or the value of zero as a new intermediate remainder and outputs the new intermediate remainder to said remainder register, but when both of the results of the subtraction by said two subtraction circuits are in the positive in sign or zero, said intermediate remainder selection circuit selects the result of the subtraction of the three-fold multiple as a new intermediate remainder and outputs the new intermediate remainder to said remainder register; and the states of the carry signals from said two subtraction circuits and the result of the comparison by said comparison circuit are stored as flags into said flag circuit;

but when the result of the comparison by said comparison circuit proves that the two upper digits of the intermediate remainder are lower than the two upper digits of the three-fold multiple of the divisor, said two multiple selection circuits are switchably controlled by said first control circuit such that the one-fold multiple and the two-fold multiple from said multiple holding means are individually selected by said two multiple selection circuits and outputted to said two subtraction circuits;

the one-fold multiple and the two-fold multiple selected by said two multiple selection circuits are simultaneously subtracted from the intermediate remainder of said remainder register individually by said two subtraction circuits;

said intermediate remainder selection circuit is switchably controlled in response to the carry signals from said two subtraction circuits by said second control circuit such that, when both of the results of the subtraction by said two subtraction circuits are in the negative in sign, said intermediate remainder selection circuit selects the intermediate remainder from said remainder register as a new intermediate remainder and outputs the intermediate remainder to said remainder register, but when one of the results of the subtraction by said two subtraction circuits is in the positive in sign or zero, said intermediate remainder selection circuit selects that one of the two results of the subtraction which has the positive sign or the value of zero as a new intermediate remainder and outputs the new intermediate remainder to said remainder register, but otherwise when both of the results of the subtraction by said two subtraction circuits are in the positive in sign or zero, said intermediate remainder selection circuit selects the result of the subtraction of the two-fold multiple as a new intermediate remainder and outputs the new intermediate remainder to said remainder register; and the states of the carry signals from said two subtraction circuits and the result of the comparison by said comparison circuit are stored as flags into said flag circuit.

11. A dividing apparatus as claimed in claim 10, wherein said multiple holding means includes:

a one-fold multiple register for holding the one-fold multiple of the divisor;

a three-fold multiple register for holding the three-fold multiple of the divisor;

a first doubling circuit for multiplying the one-fold multiple from said one-fold multiple register by two to obtain the two-fold multiple of the divisor and outputting the two-fold multiple of the divisor; and a second doubling circuit for multiplying the three-fold multiple from said three-fold multiple register by two to obtain the six-fold multiple of the divisor and outputting the six-fold multiple of the divisor.

12. A dividing apparatus as claimed in claim 11, wherein one of said two subtraction circuits is constructed as an addition and subtraction circuit having an addition function, and further comprising a selection circuit for selecting one of the dividend from said remainder register and the one-fold multiple of the divisor from said one-fold multiple register and outputting the selected value to said addition and subtraction circuit, and wherein said addition and subtraction circuit adds the one-fold multiple of the divisor from said first one-fold register selected by and inputted from said selection circuit and the two-fold multiple of the divisor from said first doubling circuit selected by and inputted from one of said two multiple selection circuits to calculate the three-fold multiple of the divisor and stores the thus calculated three-fold multiple into said three-fold multiple register.

13. A dividing apparatus as claimed in claim 12, further comprising an error notification circuit for notifying an error when the states of the positive or negative signs of the results of the subtraction by said two subtraction circuits provide a logically impossible combination.

14. A dividing apparatus as claimed in claim 11, further comprising an error notification circuit for notifying an error when the states of the positive or negative signs of the results of the subtraction by said two subtraction circuits provide a logically impossible combination.

15. A dividing apparatus as claimed in claim 10, further comprising an error notification circuit for notifying an error when the states of the positive or negative signs of the results of the subtraction by said two subtraction circuits provide a logically impossible combination.

* * * * *